US012657656B2

(12) United States Patent
Saito et al.

(10) Patent No.: US 12,657,656 B2
(45) Date of Patent: Jun. 16, 2026

(54) IMAGING APPARATUS, IMAGING METHOD, AND PROGRAM

(71) Applicant: FUJIFILM Corporation, Tokyo (JP)

(72) Inventors: Taro Saito, Saitama (JP); Takehiro Koguchi, Saitama (JP); Shinya Fujiwara, Saitama (JP); Yukinori Nishiyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 313 days.

(21) Appl. No.: 18/472,260

(22) Filed: Sep. 22, 2023

(65) Prior Publication Data

US 2024/0013343 A1 Jan. 11, 2024

Related U.S. Application Data

(63) Continuation of application No. PCT/JP2022/001633, filed on Jan. 18, 2022.

(30) Foreign Application Priority Data

Mar. 30, 2021 (JP) ................................ 2021-056872

(51) Int. Cl.
*G06K 9/00* (2022.01)
*G06T 3/4015* (2024.01)
(Continued)

(52) U.S. Cl.
CPC ............ *G06T 3/4015* (2013.01); *G06V 10/56* (2022.01); *G06V 10/761* (2022.01)

(58) Field of Classification Search
CPC ......... G06T 3/4015; G06T 2207/10024; G06T 5/70; G06V 10/56; G06V 10/761;
(Continued)

(56) References Cited

U.S. PATENT DOCUMENTS

2007/0035641 A1 2/2007 Yamada et al.
2010/0080458 A1 4/2010 Yamada et al.
(Continued)

FOREIGN PATENT DOCUMENTS

JP 2006014261 1/2006
JP 2009033699 2/2009
(Continued)

OTHER PUBLICATIONS

"Notice of Reasons for Refusal of Japan Counterpart Application", issued on Feb. 25, 2025, with English translation thereof, p. 1-p. 11.
(Continued)

*Primary Examiner* — Duy M Dang
(74) *Attorney, Agent, or Firm* — JCIPRNET

(57) ABSTRACT

An imaging apparatus includes an image sensor and a processor. The processor performs demosaicing processing on captured image data obtained by being imaged by the image sensor, acquires distance data representing a distance between the imaging apparatus and a subject for each of a plurality of pixels included in a captured image represented based on the captured image data, specifies a correction target pixel from among the plurality of pixels based on the distance data, and performs correction processing of correcting a false signal generated by the demosaicing processing, on correction target pixel data of the correction target pixel.

15 Claims, 11 Drawing Sheets

(51) Int. Cl.
*G06V 10/56* (2022.01)
*G06V 10/74* (2022.01)

(58) Field of Classification Search
CPC .... H04N 9/646; H04N 23/843; H04N 23/959; H04N 25/68
See application file for complete search history.

(56) References Cited

U.S. PATENT DOCUMENTS

| | | | | |
|---|---|---|---|---|
| 2010/0208106 | A1 | 8/2010 | Sawada et al. | |
| 2011/0280479 | A1 | 11/2011 | Yamada et al. | |
| 2012/0263353 | A1 | 10/2012 | Kitajima et al. | |
| 2013/0278801 | A1 | 10/2013 | Sawada et al. | |
| 2015/0326845 | A1 | 11/2015 | Liang et al. | |
| 2015/0334359 | A1 | 11/2015 | Hayashi et al. | |
| 2018/0205875 | A1* | 7/2018 | Nakamaru | G06T 7/80 |
| 2019/0094487 | A1* | 3/2019 | Uchida | H04N 23/67 |

FOREIGN PATENT DOCUMENTS

| | | |
|---|---|---|
| JP | 2015215895 | 12/2015 |
| JP | 2017050700 | 3/2017 |
| WO | 2011078264 | 6/2011 |
| WO | 2014122804 | 8/2014 |

OTHER PUBLICATIONS

"International Search Report (Form PCT/ISA/210) of PCT/JP2022/001633", mailed on Apr. 12, 2022, with English translation thereof, pp. 1-5.
"Written Opinion of the International Searching Authority (Form PCT/ISA/237) of PCT/JP2022/001633", mailed on Apr. 12, 2022, with English translation thereof, pp. 1-6.

* cited by examiner

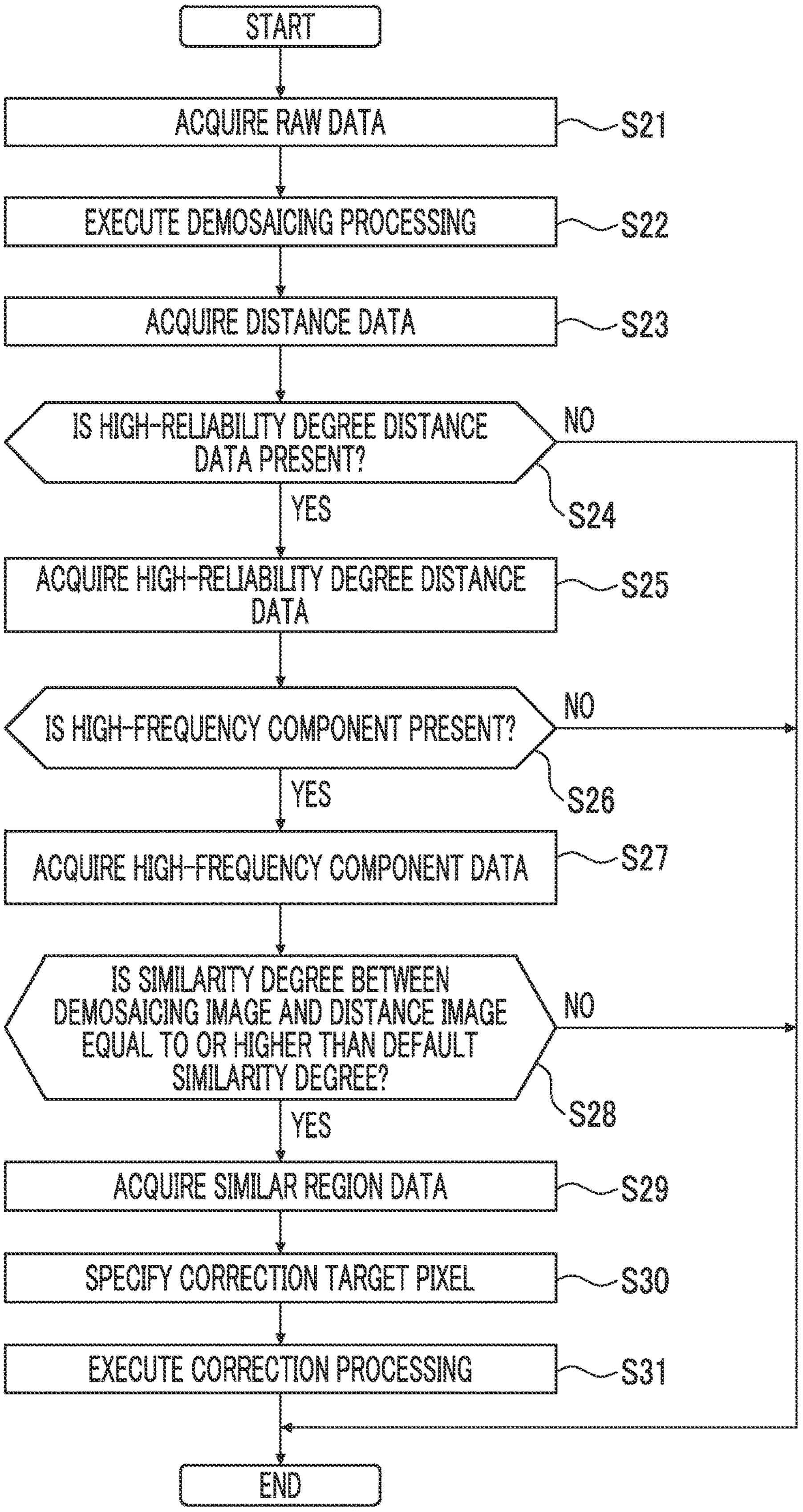

FIG. 9

START

ACQUIRE RAW DATA — S21

EXECUTE DEMOSAICING PROCESSING — S22

ACQUIRE DISTANCE DATA — S23

IS HIGH-RELIABILITY DEGREE DISTANCE DATA PRESENT? — NO

S24

YES

ACQUIRE HIGH-RELIABILITY DEGREE DISTANCE DATA — S25

IS HIGH-FREQUENCY COMPONENT PRESENT? — NO

S26

YES

ACQUIRE HIGH-FREQUENCY COMPONENT DATA — S27

IS SIMILARITY DEGREE BETWEEN DEMOSAICING IMAGE AND DISTANCE IMAGE EQUAL TO OR HIGHER THAN DEFAULT SIMILARITY DEGREE? — NO

S28

YES

ACQUIRE SIMILAR REGION DATA — S29

SPECIFY CORRECTION TARGET PIXEL — S30

EXECUTE CORRECTION PROCESSING — S31

END

IMAGING APPARATUS, IMAGING METHOD, AND PROGRAM

This application is a continuation application of International Application No. PCT/JP2022/001633, filed Jan. 18, 2022, the disclosure of which is incorporated herein by reference in its entirety. Further, this application claims priority under 35 USC 119 from Japanese Patent Application No. 2021-056872 filed Mar. 30, 2021, the disclosure of which is incorporated by reference herein.

BACKGROUND OF THE INVENTION

1. Field of the Invention

The present disclosed technology relates to an imaging apparatus, an imaging method, and a program.

2. Description of the Related Art

An image processing apparatus described in JP2006-14261A includes a wash out detection unit that detects a wash out pixel from image data, a false color pixel detection region setting unit that sets a false color pixel detection region in the vicinity of the wash out pixel detected by the wash out detection unit, a false color detection unit that specifies a pixel having a color corresponding to the false color as a false color pixel in a region set by the false color pixel detection region setting unit, and a pixel value correction unit that executes pixel value correction processing based on a vicinity pixel value on the false color pixel detected by the false color detection unit.

An image processing apparatus described in JP2009-33699A is an image processing apparatus that generates a color image containing brightness information of a plurality of colors for each pixel using a color mosaic image that contains single color brightness information of each pixel obtained from single-chip imaging elements that has pixels for photoelectrically converting a plurality of color lights different from each other, the image processing apparatus includes: a color plane separator unit that separates the color mosaic image into a plurality of color planes having only pixel values of the same color light; a coordinate conversion unit that calculates each of sampling coordinates, which are on the color mosaic image corresponding to pixel positions in the color image in a case where chromatic aberration correction is performed and differ for each color plane, based on the pixel positions of the color image generated from the color mosaic image by using a coefficient with different values depending on the color plane for each of the plurality of color planes separated by the color plane separator unit; a sampling unit that interpolates and generates pixel values at the sampling coordinates calculated by the coordinate conversion unit from pixel values of the same color light included in the color plane for each of the plurality of color planes separated by the color plane separator unit; and a color generation unit that generates a color image by combining interpolated values of each color plane interpolated and generated by the sampling unit.

An image processing apparatus described in WO2014/122804A performs demosaicing processing on mosaic image data output from an imaging element and includes a demosaicing processing unit that generates demosaicing image data, a brightness-based image data acquisition unit that acquires brightness-based image data, which is image data related to brightness, based on the demosaicing image data obtained by the demosaicing processing unit, a point image restoration processing execution unit that performs point image restoration processing on the brightness-based image data acquired by the brightness-based image data acquisition unit, an information acquisition unit that acquires control information related to execution of the point image restoration processing based on imaging information related to an imaging condition of a subject, and a point image restoration processing control unit that controls a processing operation of the point image restoration processing execution unit based on the control information acquired by the information acquisition unit.

SUMMARY OF THE INVENTION

One embodiment according to the present disclosed technology provides an imaging apparatus, an imaging method, and a program capable of suppressing moire generated in an image as compared with the case where only known demosaicing processing in the related art is performed.

An imaging apparatus according to a first aspect of the present disclosure comprises: an image sensor; and a processor, in which the processor is configured to: perform demosaicing processing on captured image data obtained by being imaged by the image sensor; acquire distance data representing a distance between the imaging apparatus and a subject for each of a plurality of pixels included in a captured image represented based on the captured image data; specify a correction target pixel from among the plurality of pixels based on the distance data; and perform correction processing of correcting a false signal generated by the demosaicing processing, on correction target pixel data of the correction target pixel.

A second aspect of the present disclosure is the imaging apparatus according to the imaging apparatus of the first aspect, in which the correction target pixel is a pixel, among the plurality of pixels, corresponding to pixel data having a first high-frequency component higher than a first default frequency.

A third aspect of the present disclosure is the imaging apparatus according to the imaging apparatus of the second aspect, in which the processor is configured to specify a pixel, from among the plurality of pixels, corresponding to the pixel data having the first high-frequency component, based on the captured image data and the distance data.

A fourth aspect of the present disclosure is the imaging apparatus according to the imaging apparatus of any one of the first to third aspects, in which the correction processing is processing of decreasing chroma saturation or is filtering processing.

A fifth aspect of the present disclosure is the imaging apparatus according to the imaging apparatus of any one of the first to third aspects, in which the processor is configured to, in a case where a similarity degree between a demosaicing image obtained by the demosaicing processing and a distance image obtained based on the distance data is equal to or higher than a default similarity degree, specify a pixel, among the plurality of pixels, included in a similar region of the demosaicing image as the correction target pixel.

A sixth aspect of the present disclosure is the imaging apparatus according to the imaging apparatus of the fifth aspect, in which the processor is configured to, in a case where the similarity degree is equal to or higher than the default similarity degree, specify pixels, among the plurality of pixels, corresponding to adjacent pixels in the distance image as the correction target pixels.

A seventh aspect of the present disclosure is the imaging apparatus according to the imaging apparatus of the fifth or sixth aspect, in which the correction processing is processing of interpolating color of the correction target pixel with color of a pixel, which is other than the correction target pixel, included in the similar region.

An eighth aspect of the present disclosure is the imaging apparatus according to the imaging apparatus of any one of the first to seventh aspects, in which the processor is configured to: acquire first distance data of which a reliability degree is equal to or higher than a first reliability degree, from the distance data; and specify a pixel, among the plurality of pixels, corresponding to the first distance data as the correction target pixel.

An imaging apparatus according to a ninth aspect of the present disclosure comprises: an image sensor; and a processor, in which the processor is configured to: acquire distance data related to a distance between the imaging apparatus and a subject for each of a plurality of pixels included in a captured image obtained by being captured by the image sensor; perform direction determination processing on the distance data; and perform demosaicing processing on captured image data representing the captured image, based on a result of the direction determination processing.

A tenth aspect of the present disclosure is the imaging apparatus according to the imaging apparatus of the ninth aspect, in which the processor is configured to: acquire second distance data of which a reliability degree is equal to or higher than a second reliability degree, from the distance data; and perform the direction determination processing on the second distance data.

An eleventh aspect of the present disclosure is the imaging apparatus according to the imaging apparatus of any one of the first to tenth aspects, in which the image sensor includes a plurality of phase difference pixels, and the processor is configured to acquire the distance data based on phase difference pixel data of the phase difference pixel, from the captured image data.

A twelfth aspect of the present disclosure is the imaging apparatus according to the imaging apparatus of the eleventh aspect, in which the phase difference pixel is a pixel for selectively outputting non-phase difference pixel data and the phase difference pixel data, the non-phase difference pixel data is pixel data obtained by performing photoelectric conversion in an entire region of the phase difference pixels, and the phase difference pixel data is pixel data obtained by performing the photoelectric conversion in a partial region of the phase difference pixels.

An imaging method according to a thirteenth aspect of the present disclosure comprises: performing demosaicing processing on captured image data obtained by being imaged by an image sensor of an imaging apparatus; acquiring distance data representing a distance between the imaging apparatus and a subject for each of a plurality of pixels included in a captured image represented based on the captured image data; specifying a correction target pixel from among the plurality of pixels based on the distance data; and performing correction processing of correcting a false signal generated by the demosaicing processing, on correction target pixel data of the correction target pixel.

An imaging method according to a fourteenth aspect of the present disclosure comprises: acquiring distance data related to a distance between an imaging apparatus and a subject for each of a plurality of pixels included in a captured image obtained by being captured by an image sensor of the imaging apparatus; performing direction determination processing on the distance data; and performing demosaicing processing on captured image data representing the captured image, based on a result of the direction determination processing.

A program according to a fifteenth aspect of the present disclosure that causes a computer to execute a process comprises: performing demosaicing processing on captured image data obtained by being imaged by an image sensor of an imaging apparatus; acquiring distance data representing a distance between the imaging apparatus and a subject for each of a plurality of pixels included in a captured image represented based on the captured image data; specifying a correction target pixel from among the plurality of pixels based on the distance data; and performing correction processing of correcting a false signal generated by the demosaicing processing, on correction target pixel data of the correction target pixel.

A program according to a sixteenth aspect of the present disclosure that causes a computer to execute a process comprises: acquiring distance data related to a distance between an imaging apparatus and a subject for each of a plurality of pixels included in a captured image obtained by being captured by an image sensor of the imaging apparatus; performing direction determination processing on the distance data; and performing demosaicing processing on captured image data representing the captured image, based on a result of the direction determination processing.

BRIEF DESCRIPTION OF THE DRAWINGS

FIG. 9 is a flowchart showing an example of a flow of the image generation processing executed by the CPU according to the second embodiment.

DESCRIPTION OF THE PREFERRED EMBODIMENTS

Hereinafter, an example of an imaging apparatus, an imaging method, and a program according to the present disclosed technology will be described with reference to the accompanying drawings.

First, the wording used in the following description will be described.

CPU refers to an abbreviation of a "Central Processing Unit". GPU refers to an abbreviation of a "Graphics Processing Unit". TPU refers to an abbreviation of a "Tensor processing unit". NVM refers to an abbreviation of a "Non-volatile memory". RAM refers to an abbreviation of a "Random Access Memory". IC refers to an abbreviation of an "Integrated Circuit". ASIC refers to an abbreviation of an "Application Specific Integrated Circuit". PLD refers to an abbreviation of a "Programmable Logic Device". FPGA refers to an abbreviation of a "Field-Programmable Gate Array". SoC refers to an abbreviation of a "System-on-a-chip". SSD refers to an abbreviation of a "Solid State Drive". USB refers to an abbreviation of a "Universal Serial Bus". HDD refers to an abbreviation of a "Hard Disk Drive". EEPROM refers to an abbreviation of an "Electrically Erasable and Programmable Read Only Memory". EL refers to an abbreviation of "Electro-Luminescence". I/F refers to an abbreviation of an "Interface". UI refers to an abbreviation of a "User Interface". fps refers to an abbreviation of a "frame per second". MF refers to an abbreviation of "Manual Focus". AF refers to an abbreviation of "Auto Focus". CMOS refers to an abbreviation of a "Complementary Metal Oxide Semiconductor". CCD refers to an abbreviation of a "Charge Coupled Device". A/D refers to an abbreviation of "Analog/Digital". PC refers to an abbreviation of "Personal Computer". ISO refers to an abbreviation of "International Organization for Standard".

In the present specification, the "parallel" indicates a parallel in the sense of including an error generally allowed in the technical field, to which the present disclosed technology belongs, in addition to the perfect parallel, and an error that does not go against the gist of the present disclosed technology. Further, in the description of the present specification, the meaning of "coinciding with each other" includes not only "completely coinciding with each other" but also "coinciding with each other with an error generally acceptable in a technical field to which the present disclosed technology belongs to an extent that is not inconsistent with the gist of the present disclosed technology".

First Embodiment

Figure 1:
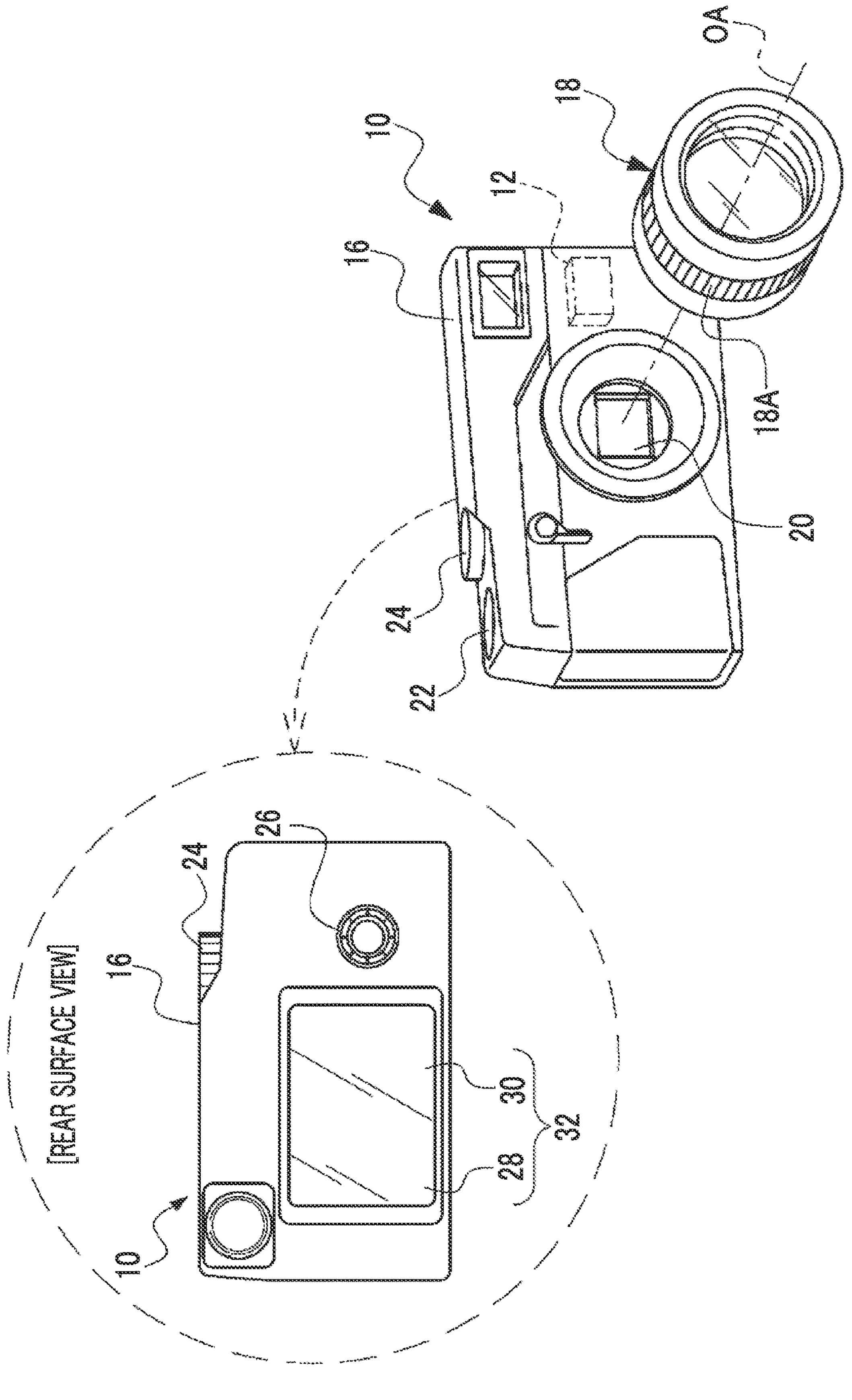
FIG. 1 is a schematic configuration diagram showing an example of a configuration of an imaging apparatus according to a first embodiment.

As an example shown in FIG. 1, the imaging apparatus 10 is an apparatus for imaging a subject and includes a controller 12, an imaging apparatus main body 16, and an interchangeable lens 18. The imaging apparatus 10 is an example of an "imaging apparatus" according to the present disclosed technology, and the controller 12 is an example of a "computer" according to the present disclosed technology. The controller 12 is built into the imaging apparatus main body 16 and controls the entire imaging apparatus 10. The interchangeable lens 18 is interchangeably attached to the imaging apparatus main body 16. The interchangeable lens 18 is provided with a focus ring 18A. In a case where a user or the like of the imaging apparatus 10 (hereinafter, simply referred to as the "user") manually adjusts the focus on the subject through the imaging apparatus 10, the focus ring 18A is operated by the user or the like.

In the example shown in FIG. 1, a lens-interchangeable digital camera is shown as an example of the imaging apparatus 10. However, the present example is only an example, and the imaging apparatus 10 may be a digital camera with a fixed lens or may be a digital camera, which is built into various electronic devices such as a smart device, a wearable terminal, a cell observation device, an ophthalmologic observation device, or a surgical microscope.

An image sensor 20 is provided in the imaging apparatus main body 16. The image sensor 20 is an example of an "image sensor" according to the present disclosed technology.

The image sensor 20 is a CMOS image sensor. The image sensor 20 captures an imaging area including at least one subject. In a case where the interchangeable lens 18 is attached to the imaging apparatus main body 16, subject light indicating the subject is transmitted through the interchangeable lens 18 and imaged on the image sensor 20, and then image data indicating an image of the subject is generated by the image sensor 20.

In the first embodiment, although the CMOS image sensor is exemplified as the image sensor 20, the present disclosed technology is not limited to this, for example, the present disclosed technology is established even in a case where the image sensor 20 is another type of image sensor such as a CCD image sensor.

A release button 22 and a dial 24 are provided on an upper surface of the imaging apparatus main body 16. The dial 24 is operated in a case where an operation mode of an imaging system, an operation mode of a playback system, and the like are set, and by operating the dial 24, an imaging mode, a playback mode, and a setting mode are selectively set as the operation mode in the imaging apparatus 10. The imaging mode is an operation mode in which the imaging is performed with respect to the imaging apparatus 10. The playback mode is an operation mode for playing the image (for example, a still image and/or a moving image) obtained by the imaging for recording in the imaging mode. The setting mode is an operation mode for setting the imaging apparatus 10 in a case where various set values used in the control related to the imaging are set.

The release button 22 functions as an imaging preparation instruction unit and an imaging instruction unit, and is capable of detecting a two-step pressing operation of an imaging preparation instruction state and an imaging instruction state. The imaging preparation instruction state refers to a state in which the release button 22 is pressed, for example, from a standby position to an intermediate position (half pressed position), and the imaging instruction state refers to a state in which the release button 22 is pressed to a final pressed position (fully pressed position) beyond the intermediate position. In the following, the "state of being pressed from the standby position to the half pressed position" is referred to as a "half pressed state", and the "state of being pressed from the standby position to the fully pressed position" is referred to as a "fully pressed state". Depending on the configuration of the imaging apparatus 10, the imaging preparation instruction state may be a state in which the user's finger is in contact with the release button 22, and the imaging instruction state may be a state in which the operating user's finger is moved from the state of being in contact with the release button 22 to the state of being away from the release button 22.

An instruction key 26 and a touch panel display 32 are provided on a rear surface of the imaging apparatus main body 16. The touch panel display 32 includes a display 28 and a touch panel 30 (see also FIG. 2). Examples of the display 28 include an EL display (for example, an organic EL display or an inorganic EL display). The display 28 may not be an EL display but may be another type of display such as a liquid crystal display.

The display 28 displays image and/or character information and the like. The display 28 is used for imaging for a live view image, that is, for displaying a live view image obtained by performing the continuous imaging in a case where the imaging apparatus 10 is in the imaging mode. Here, the "live view image" refers to a moving image for display based on the image data obtained by being imaged by the image sensor 20. The imaging, which is performed to obtain the live view image (hereinafter, also referred to as "imaging for a live view image"), is performed according to, for example, a frame rate of 60 fps. 60 fps is only an example, and a frame rate of fewer than 60 fps may be used, or a frame rate of more than 60 fps may be used.

The display 28 is also used for displaying a still image obtained by the imaging for a still image in a case where an instruction for performing the imaging for a still image is provided to the imaging apparatus 10 via the release button 22. Further, the display 28 is also used for displaying a playback image or the like in a case where the imaging apparatus 10 is in the playback mode. Further, the display 28 is also used for displaying a menu screen where various menus can be selected and displaying a setting screen for setting the various set values used in control related to the imaging in a case where the imaging apparatus 10 is in the setting mode.

The touch panel 30 is a transmissive touch panel and is superimposed on a surface of a display region of the display 28. The touch panel 30 receives the instruction from the user by detecting contact with an indicator such as a finger or a stylus pen. In the following, for convenience of explanation, the above-mentioned "fully pressed state" also includes a state in which the user turns on a softkey for starting the imaging via the touch panel 30.

In the first embodiment, although an out-cell type touch panel display in which the touch panel 30 is superimposed on the surface of the display region of the display 28 is exemplified as an example of the touch panel display 32, this is only an example. For example, as the touch panel display 32, an on-cell type or in-cell type touch panel display can be also applied.

The instruction key 26 receives various instructions. Here, the "various instructions" refer to, for example, various instructions such as an instruction for displaying the menu screen, an instruction for selecting one or a plurality of menus, an instruction for confirming a selected content, an instruction for erasing the selected content, zooming in, zooming out, frame forwarding, and the like. Further, these instructions may be provided by the touch panel 30.

Figure 2:
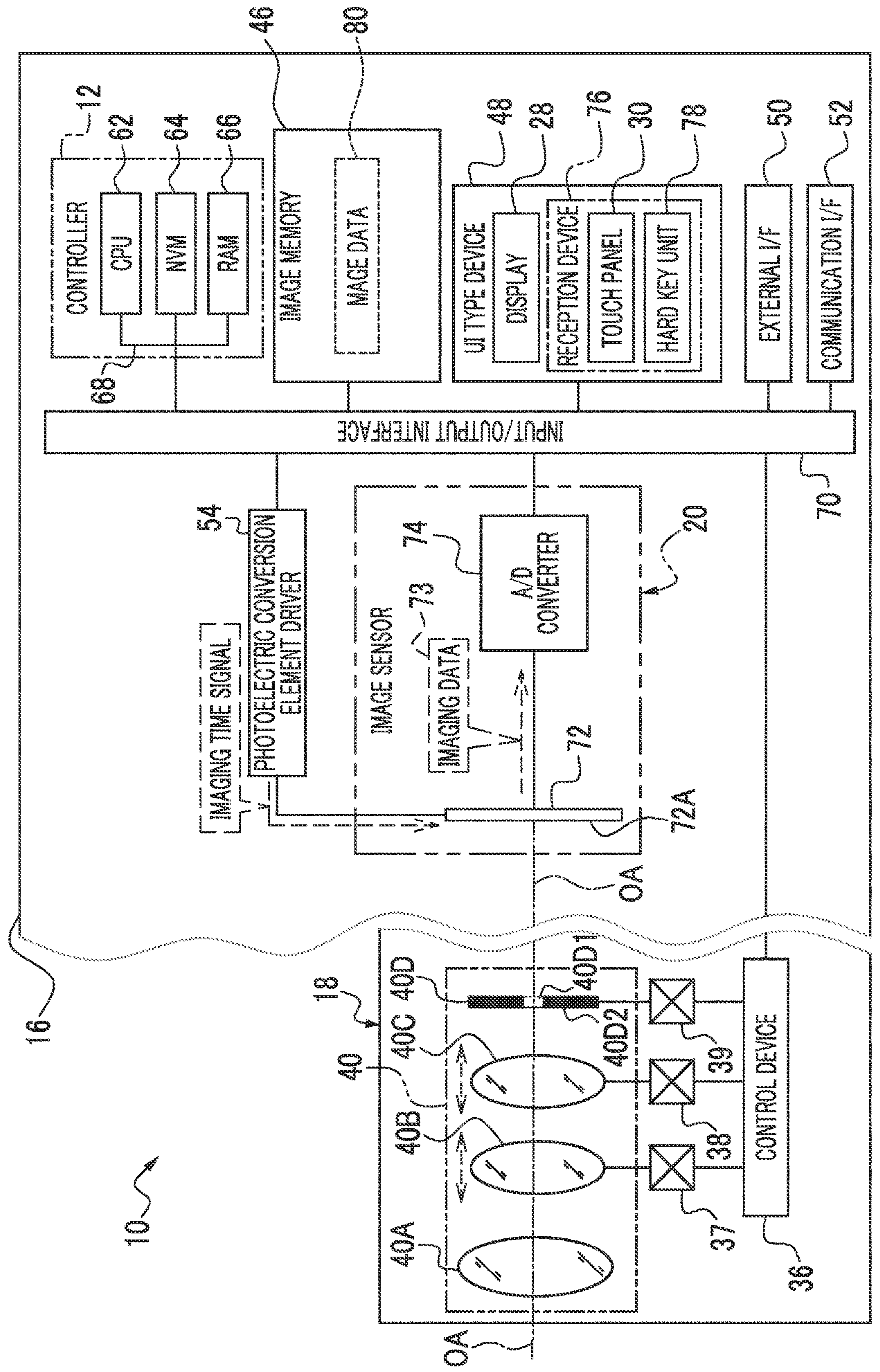
FIG. 2 is a schematic configuration diagram showing an example of hardware configurations of an optical system and an electrical system of the imaging apparatus according to the first embodiment.

As an example shown in FIG. 2, the image sensor 20 includes photoelectric conversion elements 72. The photoelectric conversion elements 72 have a light-receiving surface 72A. The photoelectric conversion elements 72 are disposed in the imaging apparatus main body 16 such that the center of the light-receiving surface 72A and an optical axis OA of the interchangeable lens 18 coincide with each other (see also FIG. 1). The photoelectric conversion elements 72 have a plurality of pixels arranged in a matrix shape, and the light-receiving surface 72A is formed by the plurality of pixels. Each pixel is a physical pixel having a photodiode (not shown), which photoelectrically converts the received light and outputs an electric signal according to the light receiving amount.

The interchangeable lens 18 includes an imaging lens 40. The imaging lens 40 has an objective lens 40A, a focus lens 40B, a zoom lens 40C, and a stop 40D. The objective lens 40A, the focus lens 40B, the zoom lens 40C, and the stop 40D are disposed in the order of the objective lens 40A, the focus lens 40B, the zoom lens 40C, and the stop 40D along the optical axis OA from the subject side (object side) to the imaging apparatus main body 16 side (image side).

Further, the interchangeable lens 18 includes a control device 36, a first actuator 37, a second actuator 38, and a third actuator 39. The control device 36 controls the entire interchangeable lens 18 according to the instruction from the imaging apparatus main body 16. The control device 36 is a device having a computer including, for example, a CPU, an NVM, a RAM, and the like. The NVM of the control device 36 is, for example, an EEPROM. However, this is only an example, and an HDD and/or SSD or the like may be applied as the NVM of the control device 36 instead of or together with the EEPROM. Further, the RAM of the control device 36 temporarily stores various types of information and is used as a work memory. In the control device 36, the CPU reads out a necessary program from the NVM and executes the read various programs on the RAM to control the entire imaging lens 40.

Although a device having a computer is exemplified here as an example of the control device 36, this is only an example, and a device including an ASIC, FPGA, and/or PLD may be applied. Further, as the control device 36, for example, a device implemented by a combination of a hardware configuration and a software configuration may be used.

The first actuator 37 includes a slide mechanism for focus (not shown) and a motor for focus (not shown). The focus lens 40B is attached to the slide mechanism for focus to be slidable along the optical axis OA. Further, the motor for focus is connected to the slide mechanism for focus, and the slide mechanism for focus operates by receiving the power of the motor for focus to move the focus lens 40B along the optical axis OA.

The second actuator 38 includes a slide mechanism for zoom (not shown) and a motor for zoom (not shown). The zoom lens 40C is attached to the slide mechanism for zoom to be slidable along the optical axis OA. Further, the motor for zoom is connected to the slide mechanism for zoom, and the slide mechanism for zoom operates by receiving the power of the motor for zoom to move the zoom lens 40C along the optical axis OA.

Here, although an example of the embodiment in which the slide mechanism for focus and the slide mechanism for zoom are provided separately has been described, this is only an example, and it may be an integrated type slide mechanism capable of realizing both focusing and zooming. Further, in this case, the power, which is generated by one motor, may be transmitted to the slide mechanism without using a motor for focus and a motor for zoom.

The third actuator 39 includes a power transmission mechanism (not shown) and a motor for stop (not shown). The stop 40D has an opening 40D1 and is a stop in which the size of the opening 40D1 is variable. The opening 40D1 is formed by a plurality of stop leaf blades 40D2, for example. The plurality of stop leaf blades 40D2 are connected to the power transmission mechanism. Further, the motor for stop is connected to the power transmission mechanism, and the power transmission mechanism transmits the power of the motor for stop to the plurality of stop leaf blades 40D2. The plurality of stop leaf blades 40D2 receives the power that is transmitted from the power transmission mechanism and changes the size of the opening 40D1 by being operated. By changing the size of the opening 40D1, the stop amount obtained by the stop 40D is changed, whereby the exposure is adjusted.

The motor for focus, the motor for zoom, and the motor for stop are connected to the control device 36, and the control device 36 controls each drive of the motor for focus, the motor for zoom, and the motor for stop. In the first embodiment, a stepping motor is adopted as an example of the motor for focus, the motor for zoom, and the motor for stop. Therefore, the motor for focus, the motor for zoom, and the motor for stop operate in synchronization with a pulse signal in response to a command from the control device 36. Although an example in which the motor for focus, the motor for zoom, and the motor for stop are provided in the interchangeable lens 18 has been described here, this is only an example, and at least one of the motor for focus, the motor for zoom, or the motor for stop may be provided in the imaging apparatus main body 16. The constituent and/or operation method of the interchangeable lens 18 can be changed as needed.

In the imaging apparatus 10, in the case of the imaging mode, an MF mode and an AF mode are selectively set according to the instructions provided to the imaging apparatus main body 16. The MF mode is an operation mode for manually focusing. In the MF mode, for example, by operating the focus ring 18A or the like by the user, the focus lens 40B is moved along the optical axis OA with the movement amount according to the operation amount of the focus ring 18A or the like, thereby the position of the focus is adjusted. AF is performed in the AF mode. The AF refers to processing of adjusting the position of the focus according to a signal obtained from the image sensor 20. For example, in the AF mode, a distance between the imaging apparatus 10 and the subject is calculated by the imaging apparatus main body 16, and the focus lens 40B is moved along the optical axis OA to a position where the subject is in focus, whereby the position of the focus is adjusted.

The imaging apparatus main body 16 includes the image sensor 20, the controller 12, an image memory 46, a UT type device 48, an external T/F 50, a communication T/F 52, a photoelectric conversion element driver 54, and an input/output interface 70. Further, the image sensor 20 includes the photoelectric conversion elements 72 and an A/D converter 74.

The controller 12, the image memory 46, the UI type device 48, the external I/F 50, the communication I/F 52, the photoelectric conversion element driver 54, and the A/D converter 74 are connected to the input/output interface 70. Further, the control device 36 of the interchangeable lens 18 is also connected to the input/output interface 70.

The controller 12 controls the entire imaging apparatus 10. That is, in the example shown in FIG. 2, the image memory 46, the UI type device 48, the external I/F 50, the communication I/F 52, the photoelectric conversion element driver 54, and the control device 36 are controlled by the controller 12. The controller 12 includes a CPU 62, an NVM 64, and a RAM 66. The CPU 62 is an example of a "processor" according to the present disclosed technology, and the NVM 64 and/or the RAM 66 are an example of a "memory" according to the present disclosed technology.

The CPU 62, the NVM 64, and the RAM 66 are connected via a bus 68, and the bus 68 is connected to the input/output interface 70. In the example shown in FIG. 2, one bus is shown as the bus 68 for convenience of illustration, but the bus 68 may be a plurality of buses. The bus 68 may be a serial bus or may be a parallel bus including a data bus, an address bus, a control bus, and the like.

The NVM 64 is a non-temporary storage medium that stores various parameters and various programs. The various programs include a program 65 (see FIG. 4), which will be described later. For example, the NVM 64 is an EEPROM. However, this is only an example, and an HDD and/or SSD or the like may be applied as the NVM 64 instead of or together with the EEPROM. Further, the RAM 66 temporarily stores various types of information and is used as a work memory. The CPU 62 reads out a necessary program from the NVM 64 and executes the read program in the RAM 66. The CPU 62 performs image processing according to a program executed on the RAM 66.

The photoelectric conversion element driver 54 is connected to the photoelectric conversion elements 72. The photoelectric conversion element driver 54 supplies an imaging time signal, which defines a time at which the imaging is performed by the photoelectric conversion elements 72, to the photoelectric conversion elements 72 according to an instruction from the CPU 62. The photoelectric conversion elements 72 perform reset, exposure, and output of an electric signal according to the imaging time signal supplied from the photoelectric conversion element driver 54. Examples of the imaging time signal include a vertical synchronization signal, and a horizontal synchronization signal.

In a case where the interchangeable lens 18 is attached to the imaging apparatus main body 16, the subject light incident on the imaging lens 40 is imaged on the light-receiving surface 72A by the imaging lens 40. Under the control of the photoelectric conversion element driver 54, the photoelectric conversion elements 72 photoelectrically convert the subject light, which is received from the light-receiving surface 72A, and output the electric signal corresponding to the amount of light of the subject light to the A/D converter 74 as imaging data 73 indicating the subject light. Specifically, the A/D converter 74 reads out the imaging data 73 from the photoelectric conversion elements 72 in units of one frame and for each horizontal line by using an exposure sequential reading out method. The A/D converter 74 digitizes the analog imaging data 73 that is read from the photoelectric conversion element 72.

The UI type device 48 comprises a display 28. The CPU 62 displays image data 80, which is stored in the image memory 46, on the display 28. The image data 80 is data generated based on the imaging data 73, as will be described later. Further, the CPU 62 displays various types of information on the display 28.

The UI type device 48 includes a reception device 76 that receives an instruction from the user. The reception device 76 includes a touch panel 30 and a hard key unit 78. The hard key unit 78 is a plurality of hard keys including an instruction key 26 (see FIG. 1). The CPU 62 operates according to various instructions received by using the touch panel 30. Here, although the hard key unit 78 is included in the UI type device 48, the present disclosed technology is not limited to this, for example, the hard key unit 78 may be connected to the external I/F 50.

The external I/F 50 controls the exchange of various information between the imaging apparatus 10 and an apparatus existing outside the imaging apparatus 10 (hereinafter, also referred to as an "external apparatus"). Examples of the external I/F 50 include a USB interface. The external apparatus (not shown) such as a smart device, a personal computer, a server, a USB memory, a memory card, and/or a printer is directly or indirectly connected to the USB interface.

The communication I/F 52 is connected to a network (not shown). The communication I/F 52 controls the exchange of information between a communication device (not shown) such as a server on the network and the controller 12. For example, the communication I/F 52 transmits information in response to a request from the controller 12 to the communication device via the network. Further, the communication I/F 52 receives the information transmitted from the communication device and outputs the received information to the controller 12 via the input/output interface 70.

Figure 3:
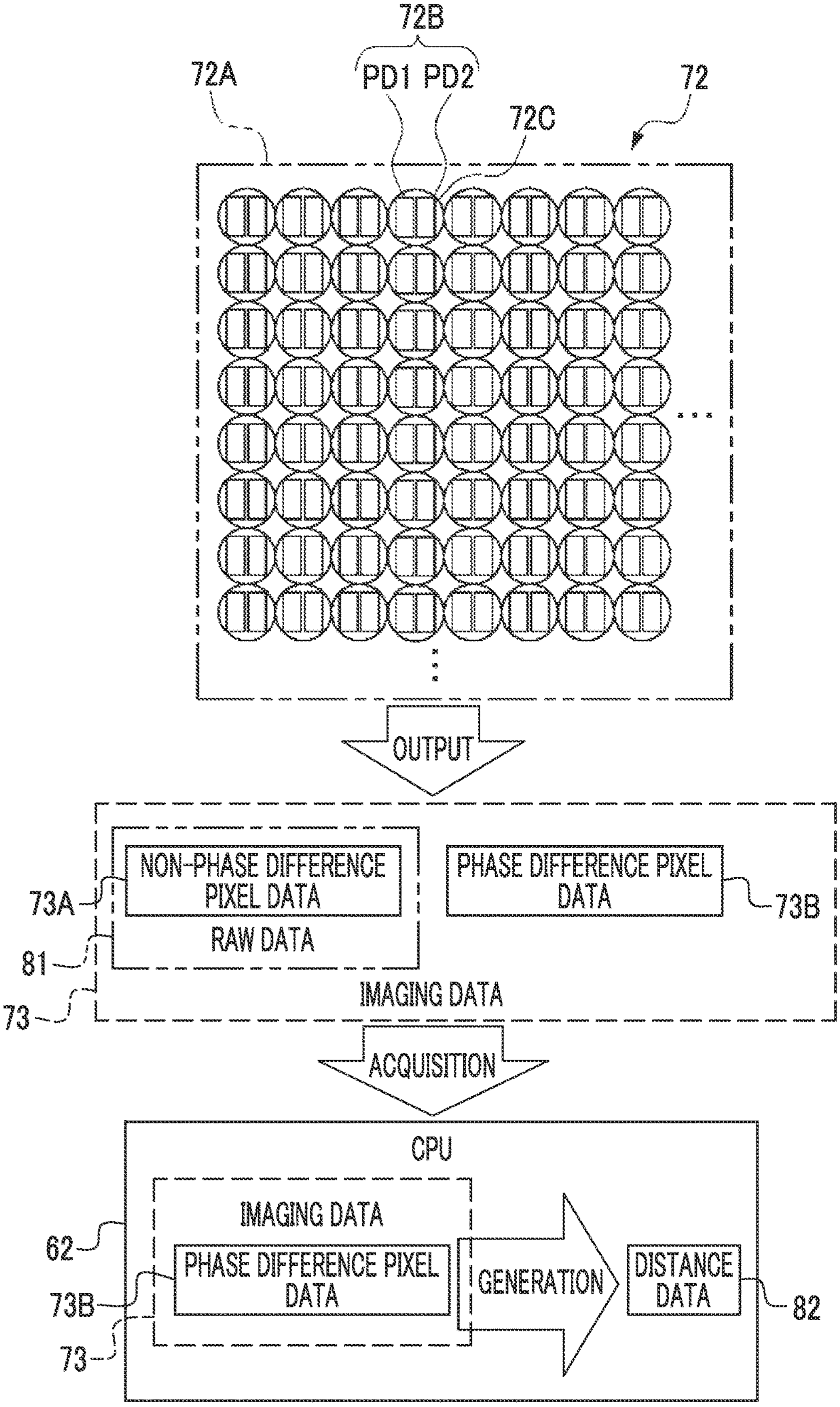
FIG. 3 is a schematic configuration diagram showing an example of a configuration of a photoelectric conversion element according to the first embodiment.

As an example shown in FIG. 3, the plurality of photosensitive pixels 72B are two-dimensionally arranged on the light-receiving surface 72A of the photoelectric conversion element 72. A color filter (not shown) and a micro lens 72C are disposed in each of the photosensitive pixels 72B. In FIG. 3, one direction that is parallel to the light-receiving surface 72A (for example, a row direction of the two-dimensionally arranged plurality of photosensitive pixels 72B) is defined as the X direction, and a direction that is orthogonal to the X direction (for example, a column direction of the two-dimensionally arranged plurality of photosensitive pixels 72B) is defined as the Y direction. The plurality of photosensitive pixels 72B are arranged along the X direction and the Y direction. Each photosensitive pixel 72B includes a pair of independent photodiodes PD1 and PD2.

A first luminous flux (for example, a luminous flux passing through a first pupil portion region in the imaging lens 40 (see FIG. 2)), which is obtained by pupil-splitting a luminous flux (hereinafter also referred to as "subject luminous flux") indicating a subject transmitted through the imaging lens 40, is incident on the photodiode PD1, and a second luminous flux (for example, a luminous flux passing through a second pupil portion region in the imaging lens 40 (see FIG. 2)), which is obtained by pupil-splitting the subject luminous flux, is incident on the photodiode PD2. The photodiode PD1 performs photoelectric conversion with respect to the first luminous flux. The photodiode PD2 performs photoelectric conversion with respect to the second luminous flux.

As an example, the photoelectric conversion element 72 is an image plane phase difference type photoelectric conversion element in which a pair of photodiodes PD1 and PD2 is provided in one photosensitive pixel 72B. As an example, the photoelectric conversion element 72 also has a function of outputting data that is related to the imaging and the phase difference with the photosensitive pixels 72B. In a case where imaging is performed in the imaging mode, the photoelectric conversion element 72 outputs non-phase difference pixel data 73A by combining the pair of photodiodes PD1 and PD2 into one photosensitive pixel 72B. Further, in the AF mode, the photoelectric conversion element 72 outputs phase difference pixel data 73B by detecting a signal from each of the pair of photodiodes PD1 and PD2. That is, all the photosensitive pixels 72B, which are provided in the photoelectric conversion element 72, are so-called phase difference pixels.

The photosensitive pixel 72B can selectively output the non-phase difference pixel data 73A and the phase difference pixel data 73B. The non-phase difference pixel data 73A is pixel data obtained by performing the photoelectric conversion in the entire region of the photosensitive pixels 72B, and the phase difference pixel data 73B is pixel data obtained by performing the photoelectric conversion in a partial region of the photosensitive pixels 72B. Here, the "entire region of photosensitive pixels 72B" is a light-receiving region where the photodiode PD1 and the photodiode PD2 are combined. Further, a "partial region of photosensitive pixels 72B" is a light-receiving region of the photodiode PD1 or a light-receiving region of the photodiode PD2.

The non-phase difference pixel data 73A can also be generated based on the phase difference pixel data 73B. For example, the non-phase difference pixel data 73A is generated by adding the phase difference pixel data 73B for each pair of pixel signals corresponding to the pair of photodiodes PD1 and PD2. Further, the phase difference pixel data 73B may include only data that is output from one of the pair of photodiodes PD1 or PD2. For example, in a case where the phase difference pixel data 73B includes only the data that is output from the photodiode PD1, it is possible to create data that is output from the photodiode PD2 by subtracting the phase difference pixel data 73B from the non-phase difference pixel data 73A for each pixel.

The photosensitive pixel 72B is an example of a "phase difference pixel" according to the present disclosed technology. Red (R), green (G), or blue (B) color filters (not shown) are arranged in a matrix shape in a default pattern arrangement (for example, Bayer arrangement, RGB stripe arrangement, R/G checkered arrangement, X-Trans (registered trademark) arrangement, honeycomb arrangement, or the like) on the plurality of photosensitive pixels 72B. Hereinafter, in a case where the plurality of photosensitive pixels 72B are distinguished with the color filters assigned to the plurality of photosensitive pixels 72B, the photosensitive pixel 72B to which a red color filter is assigned is referred to as an R photosensitive pixel, the photosensitive pixel 72B to which a green color filter is assigned is referred to as a G photosensitive pixel, and the photosensitive pixel 72B to which a blue color filter is assigned is referred to as a B photosensitive pixel.

The imaging data 73 includes RAW data 81 and the phase difference pixel data 73B. The imaging data 73 is an example of "captured image data" according to the present disclosed technology. The RAW data 81 is obtained by performing A/D conversion on the analog non-phase difference pixel data 73A. That is, the RAW data 81 is data obtained by digitizing the non-phase difference pixel data 73A output from the photoelectric conversion element 72. The CPU 62 acquires the imaging data 73 digitized by the A/D converter 74 and acquires the distance data 82 based on the acquired imaging data 73. For example, the CPU 62 acquires the phase difference pixel data 73B from the imaging data 73 and generates the distance data 82 based on the acquired phase difference pixel data 73B. The CPU 62 (see FIG. 2) generates the image data 80 (see FIG. 2) by performing image generation processing described later based on the RAW data 81 and the distance data 82. The CPU 62 stores the generated image data 80 in the image memory 46.

Figure 4:
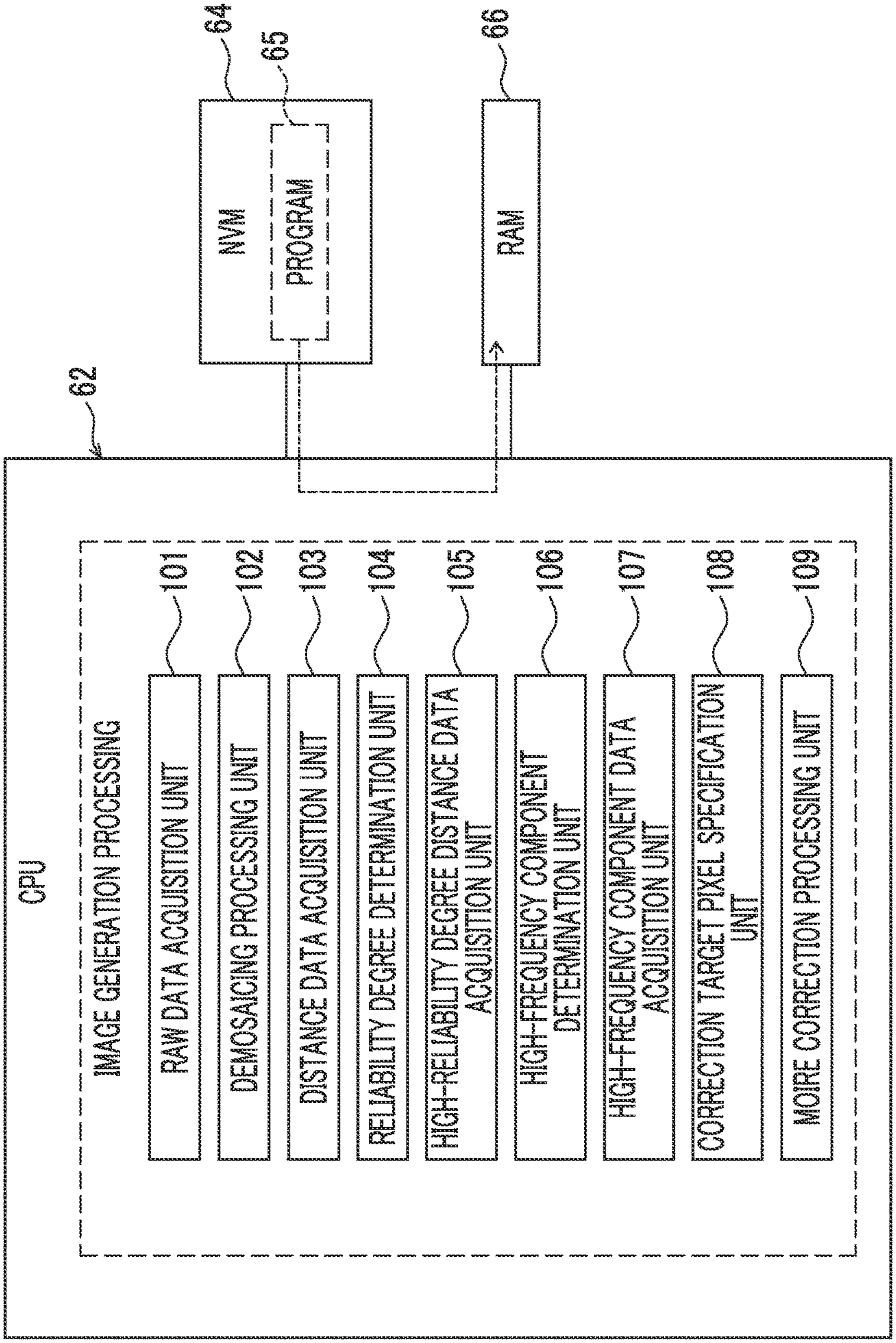
FIG. 4 is a block diagram showing an example of a functional configuration of a CPU according to the first embodiment.

As an example shown in FIG. 4, the program 65 is stored in the NVM 64. The program 65 is an example of a "program" according to the present disclosed technology. The CPU 62 reads out a program 65 from the NVM 64 and executes the read program 65 on the RAM 66.

The CPU 62 performs image generation processing of generating the image data 80 based on the imaging data 73 (see FIG. 3) according to the program 65 executed on the RAM 66.

The image generation processing is implemented by the CPU 62 operating as a RAW data acquisition unit 101, a demosaicing processing unit 102, a distance data acquisition unit 103, a reliability degree determination unit 104, a high-reliability degree distance data acquisition unit 105, a high-frequency component determination unit 106, a high-frequency component data acquisition unit 107, a correction target pixel specification unit 108, and a moire correction processing unit 109, according to the program 65.

Figure 5:
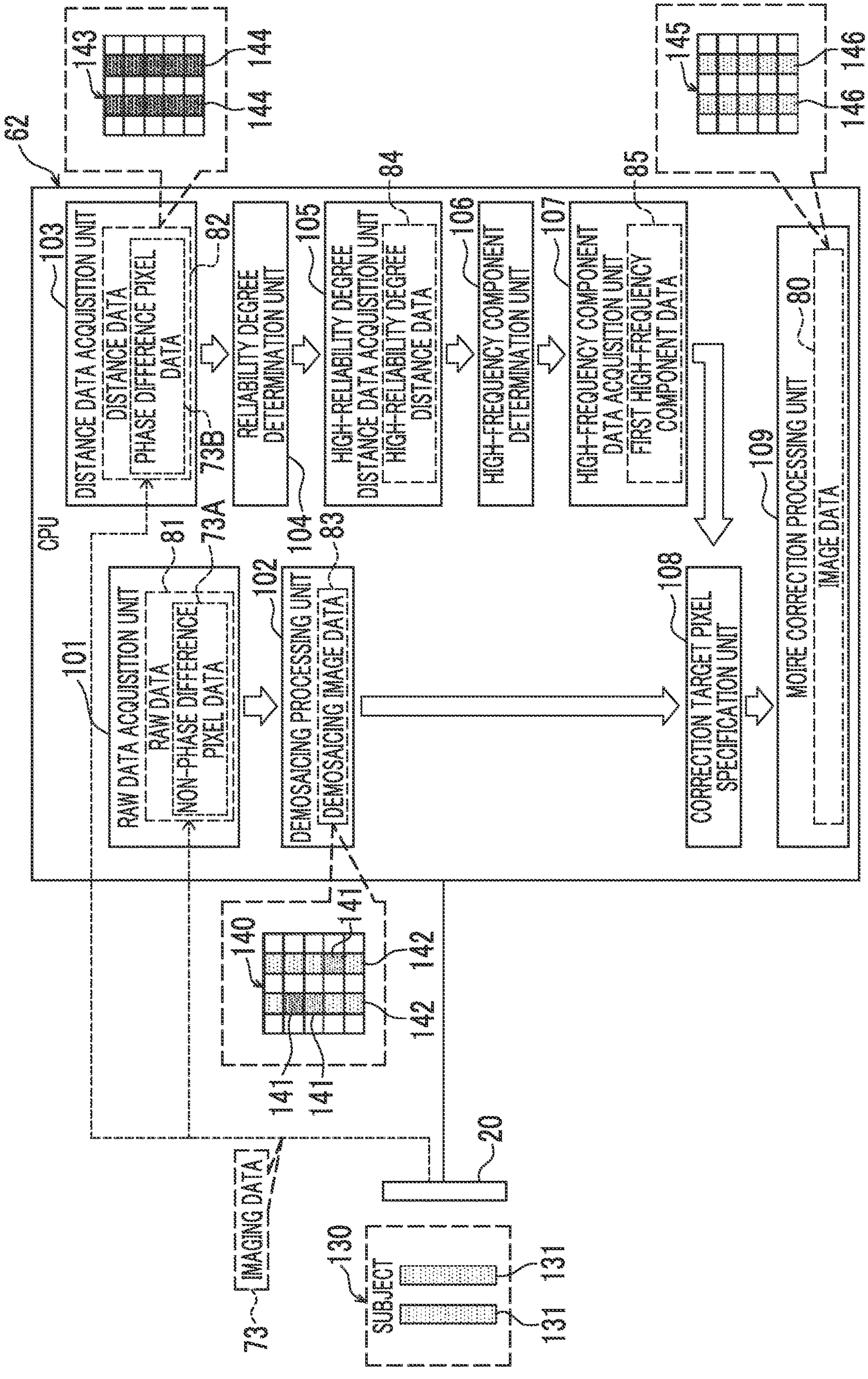
FIG. 5 is an explanatory diagram showing an example of image generation processing executed by the CPU according to the first embodiment.

As an example shown in FIG. 5, the RAW data acquisition unit 101 acquires the RAW data 81 included in the imaging data 73 obtained by being imaged by the image sensor 20.

Figure 6:
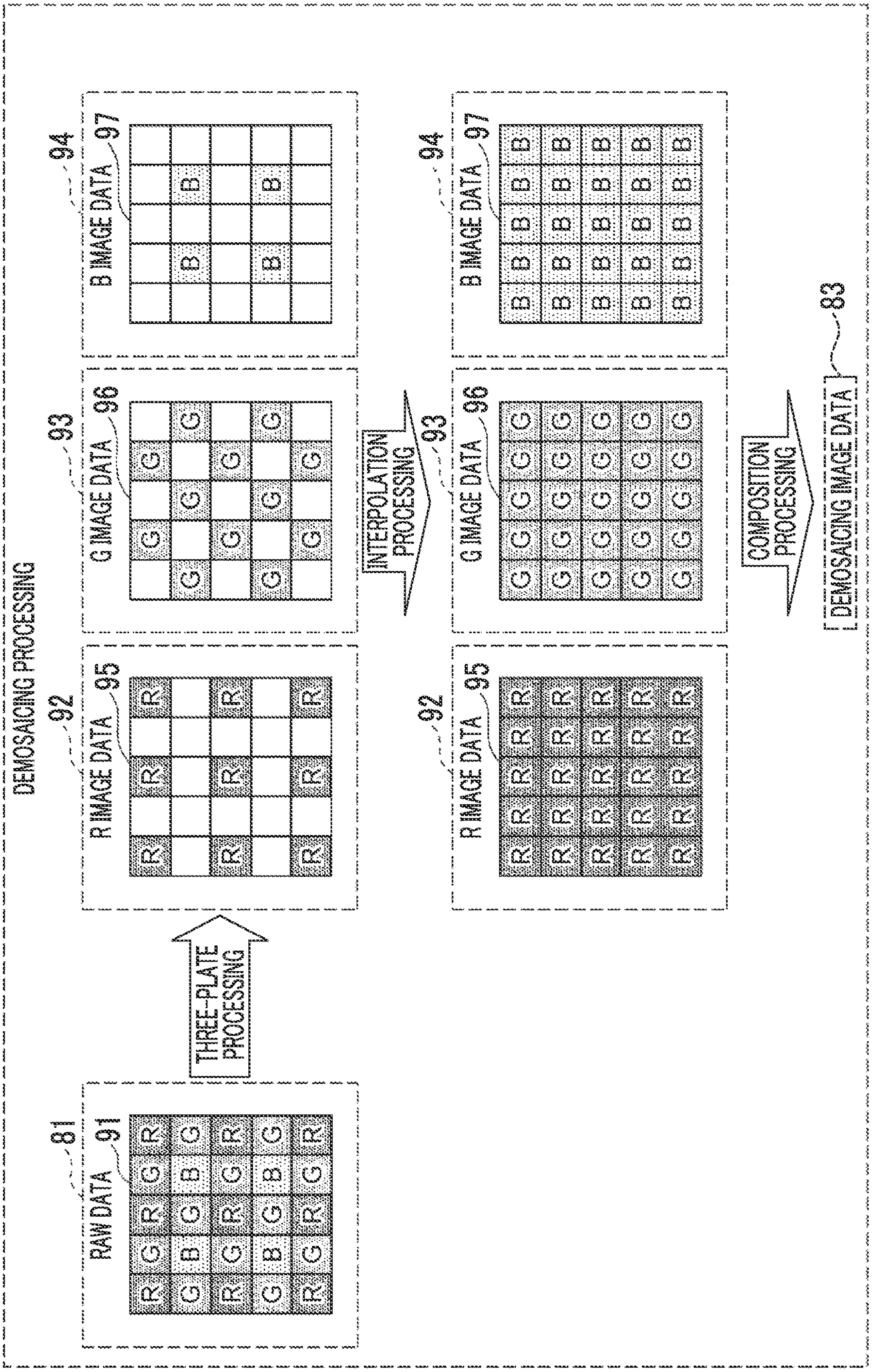
FIG. 6 is an explanatory diagram showing an example of demosaicing processing according to the first embodiment.

The demosaicing processing unit 102 performs the demosaicing processing on the RAW data 81. As an example, FIG. 6 schematically shows an example of a flow of the demosaicing processing in a case of using photoelectric conversion elements in which an R photosensitive pixel, a G photosensitive pixel, and B photosensitive pixel are arranged in a Bayer arrangement, as the photoelectric conversion elements 72 (see FIG. 3). The RAW data 81 is composed of R pixel data output from each R photosensitive pixel, G pixel data output from each G photosensitive pixel, and B pixel data output from each B photosensitive pixel. The RAW data 81 is data representing a RAW image 91. The RAW image 91 includes an R pixel corresponding to the R photosensitive pixel, a G pixel corresponding to the G photosensitive pixel, and a B pixel corresponding to the B photosensitive pixel. The R pixel is a pixel on which "R" is displayed, the G pixel is a pixel on which "G" is displayed, and the B pixel is a pixel on which "B" is displayed.

The demosaicing processing includes three-plate processing, interpolation processing, and composition processing. In the three-plate processing, the RAW data 81 is divided into R image data 92, G image data 93, and B image data 94. The R image data 92 is composed of the R pixel data output from the R photosensitive pixel and is data representing an R image 95. The G image data 93 is composed of the G pixel data output from the G photosensitive pixel and is data representing a G image 96. The B image data 94 is composed of the B pixel data output from the B photosensitive pixel and is data representing a B image 97.

In the interpolation processing, processing of interpolating a red component of a pixel that is insufficient in the G pixel and the B pixel that are arranged in the vicinity of the pixel that is insufficient is executed on the R image data 92. Further, in the interpolation processing, processing of interpolating a red component of a pixel that is insufficient in the R pixel and the B pixel that are arranged in the vicinity of the pixel that is insufficient is executed on the G image data 93. Further, in the interpolation processing, processing of interpolating a red component of a pixel that is insufficient in the R pixel and the G pixel that are arranged in the vicinity of the pixel that is insufficient is executed on the B image data 94. In the composition processing after the interpolation processing, demosaicing image data 83 is generated by combining the R image data 92, the G image data 93, and the B image data 94. As described above, the demosaicing image data 83 is obtained by performing the demosaicing processing by the demosaicing processing unit 102.

By the way, for example, in a case where a subject image includes an edge that is finer than a pixel pitch, the non-phase difference pixel data 73A that corresponds to the edge may not be accurately obtained. In this case, even in a case where the interpolation processing is performed, there is a risk of moire, which appears as a vivid color tone in the demosaicing image 140 represented based on the demosaicing image data 83, due to the occurrence of a false signal caused by the edge.

For example, the example shown in FIG. 5 is an example in which a subject 130 has two line-shaped objects 131. In the example shown in FIG. 5, as a result of performing the demosaicing processing on the RAW data 81 obtained by imaging the subject 130, a false color pixel 141, which is caused by the false signal, is generated in the demosaicing image 140 that is represented based on the demosaicing image data 83. In the present example, the phenomenon in which the false color pixel 141 is generated because of the false signal is referred to as moire. In a case where the moire is generated in this manner, the image quality is deteriorated.

In the first embodiment, in order to suppress the generation of moire in an image 145 represented based on the image data 80, the CPU 62 operates as the distance data acquisition unit 103, the reliability degree determination unit 104, the high-reliability degree distance data acquisition unit 105, the high-frequency component determination unit 106, the high-frequency component data acquisition unit 107, the correction target pixel specification unit 108, and the moire correction processing unit 109.

The distance data acquisition unit 103 acquires the distance data 82 based on the phase difference pixel data 73B included in the imaging data 73. The distance data 82 is data representing the distance between the imaging apparatus 10 and a subject for each of a plurality of pixels included in the demosaicing image 140. Further, the distance data 82 is data representing the distance image 143.

The distance image 143 includes two line images 144 corresponding to the two line-shaped objects 131 included in the subject 130. The two line images 144 are formed of in-focus pixels in which the subject 130 is in focus. On the other hand, a pixel other than the in-focus pixel, among the plurality of pixels constituting the distance image 143, is an out-of-focus pixel in which the subject 130 is not in focus. A pixel, in which a phase difference (that is, a deviation amount and a deviation direction) between a subject image based on a first signal output from the photodiode PD1 and a subject image based on a second signal output from the photodiode PD2 is 0, is an in-focus pixel where the subject 130 is in focus, and a pixel, in which the phase difference is not 0, is an out-of-focus pixel where the subject 130 is not in focus.

The reliability degree determination unit 104 determines whether or not the distance data 82 includes high-reliability degree distance data 84 of which the reliability degree is equal to or higher than the default reliability degree. For example, the reliability degree determination unit 104 determines whether or not the distance data 82 includes the high-reliability degree distance data 84 of which the reliability degree is equal to or higher than the default reliability degree by determining whether or not the plurality of pixels, which are included in the distance image 143, include a pixel of which the reliability degree is equal to or higher than the default reliability degree.

For example, for each of the plurality of pixels, as a result of calculating the phase difference based on the distance data 82, the reliability degree determination unit 104 determines that a pixel of which the phase difference is smaller than a default phase difference is a pixel of which the reliability degree is equal to or higher than the default reliability degree, and determines that a pixel of which the phase difference is equal to or greater than the default phase difference is a pixel of which the reliability degree is lower than the default reliability degree. The default phase difference is set to, for example, a value of less than 5% of the entire gradation of the pixel.

Further, for each of the plurality of pixels, as a result of calculating the distance to the subject based on the distance data 82, the reliability degree determination unit 104 determines that a pixel, of which a difference in distances between the distance to the subject of the pixel that is in focus and the distance to the subject of the target pixel is equal to or shorter than a default distance, is a pixel of which the reliability degree is equal to or higher than the default reliability degree. Further, the reliability degree determination unit 104 determines that a pixel, of which the difference in distances between the distance to the subject of the pixel that is in focus and the distance to the subject of the target pixel is longer than the default distance, is a pixel of which the reliability degree is lower than the default reliability degree. The default distance is set to a distance of ±5% of the distance of the pixels in focus to the subject.

Further, for each of the plurality of pixels, the reliability degree determination unit 104 performs image recognition processing based on the distance data 82, determines that a pixel for which the subject is recognized as a three-dimensional shape is a pixel of which the reliability degree is equal to or higher than the default reliability degree, and determines that a pixel for which the subject is recognized as a plane shape is a pixel of which the reliability degree is lower than the default reliability degree.

Further, the reliability degree determination unit 104 determines that all of the plurality of pixels in a case where imaging is performed under a condition in which the focus lens 40B is positioned closer to an image side than a default position are pixels of which the reliability degree is equal to or higher than the default reliability degree, and determines that all of the plurality of pixels in a case where the imaging is performed under a condition in which the focus lens 40B is positioned on the subject side from the default position are pixels of which the reliability degree is lower than the default reliability degree. Any default position may be determined by the user, or the default position may be calculated by the CPU 62 based on an imaging condition or the like.

Further, the reliability degree determination unit 104 determines that all of the plurality of pixels in a case where the imaging is performed under a condition in which a stop value is equal to or smaller than a default stop value are pixels of which the reliability degree is equal to or higher than the default reliability degree, and determines that all of the plurality of pixels in a case where the imaging is performed under a condition in which the stop value is greater than the default stop value are pixels of which the reliability degree is lower than the default reliability degree. Any default stop value may be determined by the user, or the default stop value may be calculated by the CPU 62 based on an imaging condition or the like.

Further, the reliability degree determination unit 104 determines that all of the plurality of pixels in a case where the imaging is performed under a condition in which an ISO sensitivity is equal to or lower than a default sensitivity are pixels of which the reliability degree is equal to or higher than the default reliability degree, and determines that all of the plurality of pixels in a case where the imaging is performed under a condition in which the ISO sensitivity is higher than the default sensitivity are pixels of which the reliability degree is lower than the default reliability degree. Any default sensitivity may be determined by the user, or the default sensitivity may be calculated by the CPU 62 based on an imaging condition or the like.

Further, in a case where the plurality of pixels, which are included in the distance image 143, include a pixel of which the reliability degree is equal to or higher than the default reliability degree, the reliability degree determination unit 104 determines that the distance data 82 includes the high-reliability degree distance data 84 of which the reliability degree is equal to or higher than the default reliability degree. On the other hand, in a case where the plurality of pixels do not include a pixel of which the reliability degree is equal to or higher than the default reliability degree, the reliability degree determination unit 104 determines that the distance data 82 does not include the high-reliability degree distance data 84 of which the reliability degree is equal to or higher than the default reliability degree.

In a case where the reliability degree determination unit 104 determines that the distance data 82 includes the high-reliability degree distance data 84 of which the reliability degree is equal to or higher than the default reliability degree, the high-reliability degree distance data acquisition unit 105 acquires the high-reliability degree distance data 84 from the distance data 82.

For example, by extracting the phase difference pixel data 73B, which corresponds to the pixel of which the reliability degree is determined to be equal to or higher than the default reliability degree by the reliability degree determination unit 104, from the distance data 82, the high-reliability degree distance data acquisition unit 105 acquires the high-reliability degree distance data 84 composed of the extracted phase difference pixel data 73B. In the first embodiment, the high-reliability degree distance data 84 of which the reliability degree is equal to or higher than the default reliability degree is acquired from the distance data 82 according to the above procedure. The high-reliability degree distance data 84 of which the reliability degree is equal to or higher than the default reliability degree is an example of "first distance data of which a reliability degree is equal to or higher than a first reliability degree" according to the present disclosed technology.

The high-frequency component determination unit 106 determines whether or not the high-reliability degree distance data 84 includes pixel data of the first high-frequency component having a frequency higher than a first default frequency (hereinafter, referred to as first high-frequency component data 85). The first high-frequency component data 85 is data having a signal component corresponding to the false signal. Any first default frequency is set by using an experiment, a computer simulation, and the like.

The high-frequency component determination unit 106 determines whether or not the high-reliability degree distance data 84 includes the first high-frequency component data 85 by performing frequency analysis processing such as Fourier transform or high-frequency component extraction processing such as high-pass filter processing, for example.

In a case where the high-frequency component determination unit 106 determines that the high-reliability degree distance data 84 includes the first high-frequency component data 85, the high-frequency component data acquisition unit 107 acquires the first high-frequency component data 85 from the high-reliability degree distance data 84. The first high-frequency component data 85 is an example of "pixel data of a first high-frequency component" according to the present disclosed technology.

The correction target pixel specification unit 108 specifies the pixel, among the plurality of pixels included in the demosaicing image 140, corresponding to the first high-frequency component data 85 as the correction target pixel that is a target of the correction. The demosaicing image 140 is an example of a "captured image" according to the present disclosed technology.

The moire correction processing unit 109 performs the correction processing of correcting the false signal, which is generated by the demosaicing processing, on the non-phase difference pixel data 73A of the pixel specified as the correction target pixel. The correction processing is processing of reducing the chroma saturation, is low-pass filter processing, or is median filter processing. The processing of reducing the chroma saturation is processing of adjusting parameters of color difference signals (for example, a Cb signal and a Cr signal). Further, the correction processing may be processing of obtaining the most frequent value or processing of obtaining a simple average value of the non-phase difference pixel data 73A output from the pixel specified as the correction target pixel and the pixels in the vicinity thereof. The non-phase difference pixel data 73A of the pixel specified as the correction target pixel is an example of "correction target pixel data" according to the present disclosed technology. The low-pass filter processing and the median filter processing are examples of "filtering processing" according to the present disclosed technology, respectively.

In the example shown in FIG. 5, the false color pixel 141, which is included in the demosaicing image 140, is corrected by performing the correction processing by the moire correction processing unit 109, and in the image 145, which is represented by the image data 80, the two line images 146 corresponding to the two line-shaped objects 131, which are included in the subject 130, are normally displayed without moire.

Figure 7:
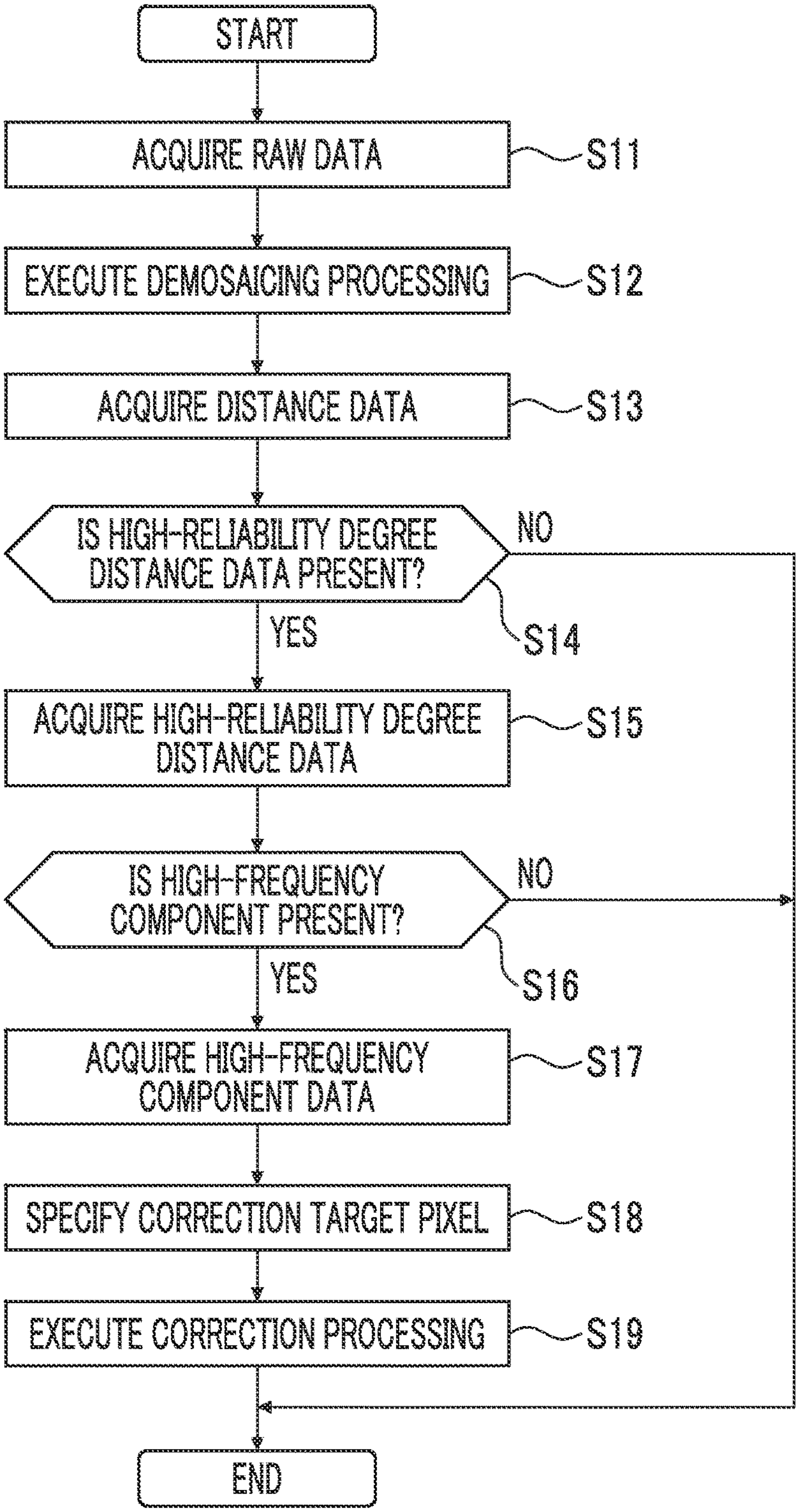
FIG. 7 is a flowchart showing an example of a flow of the image generation processing executed by the CPU according to the first embodiment.

Next, an action of the imaging apparatus 10 according to the first embodiment will be described with reference to FIG. 7. FIG. 7 shows an example of a flow of the image generation processing according to the first embodiment. The image generation processing shown in FIG. 7 is executed, for example, during the display of the live view image before an imaging instruction is provided through the release button 22 in the AF mode.

In the image generation processing shown in FIG. 7, first, in step S11, the RAW data acquisition unit 101 acquires the RAW data 81 included in the imaging data 73 obtained by being imaged by the image sensor 20.

In step S12, the demosaicing processing unit 102 performs the demosaicing processing on the RAW data 81.

In step S13, the distance data acquisition unit 103 acquires the distance data 82 based on the phase difference pixel data 73B included in the imaging data 73.

In step S14, the reliability degree determination unit 104 determines whether or not the distance data 82 includes high-reliability degree distance data 84 of which the reliability degree is equal to or higher than the default reliability degree. In step S14, in a case where the distance data 82 includes the high-reliability degree distance data 84, the determination is set as positive, and the processing shown in FIG. 7 shifts to step S15. On the other hand, in step S14, in a case where the distance data 82 does not include the high-reliability degree distance data 84, the determination is set as negative, and the processing shown in FIG. 7 is ended without performing the correction processing, which will be described later.

In step S15, the high-reliability degree distance data acquisition unit 105 acquires the high-reliability degree distance data 84 from the distance data 82.

In step S16, the high-frequency component determination unit 106 determines whether or not the high-reliability degree distance data 84 includes the first high-frequency component data 85 of which a frequency is higher than the first default frequency. In step S16, in a case where the high-reliability degree distance data 84 includes the first high-frequency component data 85, the determination is set as positive, and the processing shown in FIG. 7 shifts to step S17. On the other hand, in step S16, in a case where the high-reliability degree distance data 84 does not include the first high-frequency component data 85, the determination is set as negative, and the processing shown in FIG. 7 is ended without performing the correction processing, which will be described later.

In step S17, the high-frequency component data acquisition unit 107 acquires the first high-frequency component data 85 from the high-reliability degree distance data 84.

In step S18, the correction target pixel specification unit 108 specifies the pixel, among the plurality of pixels included in the demosaicing image 140, corresponding to the first high-frequency component data 85 as the correction target pixel that is a target of the correction.

In step S19, the moire correction processing unit 109 performs the correction processing of correcting the false signal, which is generated by the demosaicing processing, on the non-phase difference pixel data 73A of the pixel specified as the correction target pixel.

After the processing of step S19 is executed, the processing shown in FIG. 7 is ended. The imaging method described as the action of the imaging apparatus 10 described above is an example of an "imaging method" according to the present disclosed technology.

As described above, in the imaging apparatus 10 according to the first embodiment, the CPU 62 performs the demosaicing processing on the imaging data 73 obtained by being imaged by the image sensor 20. Further, the CPU 62 acquires the distance data 82 representing the distance between the imaging apparatus 10 and the subject 130 for each of the plurality of pixels included in the demosaicing image 140 and specifies the correction target pixel from the plurality of pixels based on the distance data 82. The CPU 62 performs the correction processing of correcting the false signal generated by the demosaicing processing on the non-phase difference pixel data 73A of the correction target pixel. Therefore, it is possible to suppress moire generated in the image 145 as compared with the case where, for example, only the demosaicing processing with respect to the RAW data 81 is performed.

Further, the CPU 62 acquires the first high-frequency component data 85, of which the frequency is higher than the first default frequency, from the distance data 82 and specifies a pixel, among the plurality of pixels, corresponding to the first high-frequency component data 85 as the correction target pixel. Therefore, it is possible to perform the correction processing of correcting the false signal generated by the demosaicing processing on the pixel corresponding to the first high-frequency component data 85.

Further, the CPU 62 acquires the high-reliability degree distance data 84, of which the reliability degree is equal to or higher than the default reliability degree, from the distance data 82 and specifies a pixel, among the plurality of pixels, corresponding to the high-reliability degree distance data 84 as the correction target pixel. Therefore, it is possible to improve the accuracy of specifying the correction target pixel in which the correction processing is to be performed as compared with the case where the correction target pixel is specified based on the entire distance data 82.

Further, the correction processing is processing of reducing the chroma saturation, is low-pass filter processing, or is median filter processing. Therefore, it is possible to perform the correction processing of correcting the false signal generated by the demosaicing processing on the non-phase difference pixel data 73A of the correction target pixel.

Further, the image sensor 20 includes the plurality of photosensitive pixels 72B that are phase difference pixels, and the CPU 62 acquires the distance data 82 from the imaging data 73 based on the phase difference pixel data 73B of the phase difference pixel. Therefore, the distance data 82 can be acquired from the imaging data 73.

Further, the photosensitive pixel 72B is a pixel for selectively outputting the non-phase difference pixel data 73A and the phase difference pixel data 73B, the non-phase difference pixel data 73A is pixel data obtained by performing photoelectric conversion in an entire region of the photosensitive pixels 72B, and the phase difference pixel data 73B is pixel data obtained by performing the photoelectric conversion in a partial region of the photosensitive pixels 72B. Therefore, the RAW data 81 and the distance data 82 can be acquired from the imaging data 73.

In the first embodiment, the CPU 62 may acquire the first high-frequency component data of which the frequency is higher than the first default frequency from RAW data 81 and distance data 82, and may specify a pixel, from among the plurality of pixels, having the first high-frequency component data as the correction target pixel based on the RAW data 81 and the distance data 82. In the present modification example, it is possible to improve the accuracy of specifying the correction target pixel in which the correction processing is to be performed as compared with the case where the correction target pixel is specified based on only the distance data 82.

Further, in the first embodiment, although the CPU 62 acquires the high-reliability degree distance data 84 from the distance data 82 and acquires the first high-frequency component data 85 from the high-reliability degree distance data 84, the CPU 62 may acquire the first high-frequency component data 85 from the distance data 82.

Further, in the first embodiment, although the distance is acquired for a position corresponding to each of the pixels included in the photoelectric conversion element 72, the CPU 62 does not necessarily need to obtain the distance from the positions corresponding to all the pixels. That is, the pixels for acquiring the distance may be thinned out.

Further, in the first embodiment, although the photoelectric conversion element 72 is an image plane phase difference type photoelectric conversion element in which a pair of photodiodes PD1 and PD2 is provided in one photosensitive pixel 72B and all the photosensitive pixels 72B have a function of outputting data related to imaging and phase difference, all the photosensitive pixels 72B are not limited to having the function of outputting data related to imaging and a phase difference. The photoelectric conversion element 72 may include a pixel that does not have a function of outputting data related to the imaging and a phase difference.

Further, the photoelectric conversion element 72 is not limited to an image plane phase difference type photoelectric conversion element in which the pair of photodiodes PD1 and PD2 is provided in one photosensitive pixel 72B, the photoelectric conversion element 72 may include imaging pixels for acquiring the non-phase difference pixel data 73A and phase difference detection pixels for acquiring the phase difference pixel data 73B. In this case, the phase difference pixel is provided with a light shielding member to light-receive on one of the first pupil portion region and the second pupil portion region.

Further, in the first embodiment, although the distance data 82 is acquired by the phase difference type photoelectric conversion element 72, it is not limited to the phase difference type, and the distance data 82 may be acquired by using a TOF type photoelectric conversion element, or the distance data 82 may be acquired by using a stereo camera or a depth sensor. The distance data 82 may be acquired in accordance with the frame rate of the image sensor 20 or may be acquired at a time interval longer or shorter than a time interval defined by the frame rate of the image sensor 20.

Second Embodiment

As an example shown in FIG. 8, in a second embodiment, the functional configuration of the CPU 62 is changed as follows with respect to the first embodiment. That is, the CPU 62 operates as the RAW data acquisition unit 101, the demosaicing processing unit 102, the distance data acquisition unit 103, the reliability degree determination unit 104, the high-reliability degree distance data acquisition unit 105, the high-frequency component determination unit 106, the high-frequency component data acquisition unit 107, a similar region determination unit 110, a similar region data acquisition unit 111, a correction target pixel specification unit 112, and a moire correction processing unit 113.

The RAW data acquisition unit 101, the demosaicing processing unit 102, the distance data acquisition unit 103, the reliability degree determination unit 104, the high-reliability degree distance data acquisition unit 105, the high-frequency component determination unit 106, and the high-frequency component data acquisition unit 107 are the same as those in the first embodiment.

Figure 8:
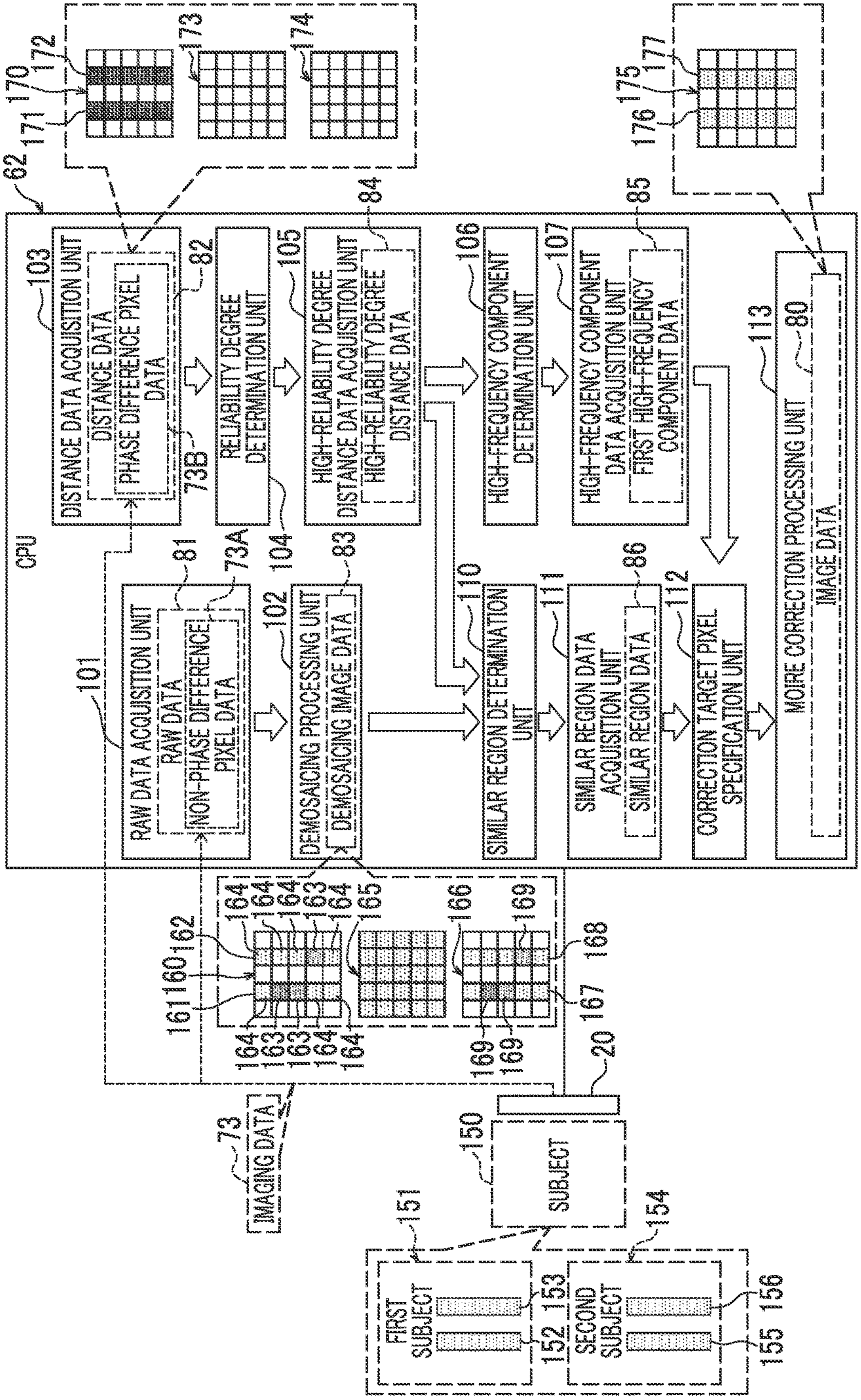
FIG. 8 is an explanatory diagram showing an example of the image generation processing executed by the CPU according to a second embodiment.

As an example, FIG. 8 shows an example of a variation of a subject 150 and a variation of the demosaicing image represented by the demosaicing image data 83 and the distance image represented by the distance data 82.

For example, a first demosaicing image 160, which is a first example of the demosaicing image, is an image obtained by capturing a first subject 151 in a state in which the first subject 151, which is a three-dimensional-shaped object, is in focus as the subject 150. The first demosaicing image 160 includes two line images 161 and 162 corresponding to the two line-shaped objects 152 and 153 included in the first subject 151.

A second demosaicing image 165, which is a second example of the demosaicing image, is an image obtained by capturing the first subject 151 in a state in which the first subject 151 is not in focus as the subject 150. In the second demosaicing image 165, the two line-shaped objects 152 and 153, which are included in the first subject 151, are displayed in a blurred state over the entire plurality of pixels.

A third demosaicing image 166, which is a third example of the demosaicing image, is an image obtained by capturing a second subject 154 in a state in which the second subject 154, which is a plane-shaped object such as printed material, is in focus as the subject 150. The second subject 154 is a plane-shaped object such as a printed material that displays an image obtained by imaging the first subject 151. The third demosaicing image 166 includes two line images 167 and 168 corresponding to the two line images 155 and 156 included in the second subject 154.

A first distance image 170, which is a first example of the distance image, is an image obtained by imaging the first subject 151 in a state in which the first subject 151 is in focus. The first distance image 170 includes two line images 171 and 172 corresponding to the two line-shaped objects 152 and 153 included in the first subject 151.

A second distance image 173, which is a second example of the distance image, is an image obtained by imaging the first subject 151 in a state in which the first subject 151 is not in focus. The second distance image 173 is an image in which there is no difference in distance between a plurality of pixels and the first subject 151, and the difference in distance between the plurality of pixels and the first subject 151 is uniform over the entire plurality of pixels.

A third distance image 174, which is a third example of the distance image, is an image obtained by imaging the second subject 154 in a state in which the second subject 154 is in focus. The third distance image 174 is an image in which there is no difference in distance between a plurality of pixels and the second subject 154, and the difference in distance between the plurality of pixels and the second subject 154 is uniform over the entire plurality of pixels.

Moire is generated because the subject image includes an edge, and therefore the moire is generated at the time of focusing and is not generated at the time of non-focusing. That is, the first demosaicing image 160 includes a false color pixel 163 and the third demosaicing image 166 includes a false color pixel 169, but the second demosaicing image 165 does not include a false color pixel.

Further, the demosaicing image represented based on the demosaicing image data 83 and the distance image represented based on the distance data 82 may or may not be similar depending on a type and/or an imaging condition of the subject 150.

For example, the first demosaicing image 160, which is obtained by imaging the first subject 151 in a state in which the first subject 151 that is a three-dimensional-shaped object is in focus, is similar to the first distance image 170, which is obtained by imaging the first subject 151 in a state in which the first subject 151 is in focus, and is not similar to the second distance image 173, which is obtained by imaging the first subject 151 in a state in which the first subject 151 is not in focus. That is, the first distance image 170 includes the two line images 171 and 172 corresponding to the two line images 161 and 162 included in the first demosaicing image 160, but the second distance image 173 does not include two line images corresponding to the two line images 161 and 162 included in the first demosaicing image 160.

Further, the second demosaicing image 165, which is obtained by imaging the first subject 151 in a state in which the first subject 151 that is a three-dimensional-shaped object is not in focus, is not similar to the first distance image 170, which is obtained by imaging the first subject 151 in a state in which the first subject 151 is in focus and the second distance image 173, which is obtained by imaging the first subject 151 in a state in which the first subject 151 is not in focus. That is, in the second demosaicing image 165, the two line-shaped objects 152 and 153, which are included in the first subject 151, are displayed in a blurred state over the entire plurality of pixels, but in the first distance image 170 and the second distance image 173, the two line-shaped objects 152 and 153, which are included in the first subject 151, are not displayed.

Further, for example, the third demosaicing image 166, which is obtained by imaging the second subject 154 in a state in which the second subject 154 that is a plane-shaped object such as a printed material is in focus, is not similar to the third distance image 174, which is obtained by imaging the second subject 154 in a state in which the second subject 154 is in focus. That is, the third distance image 174 does not include the two line images corresponding to the two line images 167 and 168 included in the third demosaicing image 166.

As described above, the demosaicing image represented based on the demosaicing image data 83 and the distance image represented based on the distance data 82 may or may not be similar depending on a type and/or an imaging condition of the subject 150.

The similar region determination unit 110 determines whether or not the similarity degree between the demosaicing image and the distance image is equal to or higher than a default similarity degree based on the demosaicing image data 83 and the high-reliability degree distance data 84. The default similarity degree is set to a value at which the similarity or dissimilarity of the above-described demosaicing image and distance image can be determined. The default similarity degree may be a fixed value or a set value set by the user. At least one of a box filter, a mean squared error, or template matching may be used to calculate the similarity degree.

In the example shown in FIG. 8, in a case where the first subject 151 is imaged in a state in which the first subject 151 is in focus, the line image 161, which is included in the first demosaicing image 160, corresponds to a similar region similar to the line image 171 included in the first distance image. Further, the line image 162, which is included in the first demosaicing image 160, corresponds to a similar region similar to the line image 172 included in the first distance image.

In a case where it is determined that the similarity degree between the demosaicing image and the distance image is equal to or higher than the default similarity degree, the similar region data acquisition unit 111 acquires data corresponding to the similar region (hereinafter, referred to as similar region data 86) from the demosaicing image data 83.

The correction target pixel specification unit 112 specifies a pixel included in the similar region of the demosaicing image as the correction target pixel based on the similar region data 86.

In the example shown in FIG. 8, for example, the correction target pixel specification unit 112 specifies a pixel (that is, a pixel corresponding to the false color pixel 163), among the pixels included in the similar region of the first demosaicing image 160, corresponding to the first high-frequency component data 85 as the correction target pixel that is a target of the correction.

The moire correction processing unit 113 performs the correction processing of correcting the false signal, which is generated by the demosaicing processing, on the non-phase difference pixel data 73A of the pixel specified as the correction target pixel. As an example, the correction processing is processing of interpolating the color of the correction target pixel with color of a pixel included in the similar region other than the correction target pixel.

In the example shown in FIG. 8, for example, the moire correction processing unit 113 corrects the non-phase difference pixel data 73A of a pixel corresponding to the false color pixel 163 included in the line image 161 by using the non-phase difference pixel data 73A of a pixel corresponding to the pixel 164 included in the line image 161. Similarly, the moire correction processing unit 113 corrects the non-phase difference pixel data 73A of a pixel corresponding to the false color pixel 163 included in the line image 162 by using the non-phase difference pixel data 73A of a pixel corresponding to the pixel 164 included in the line image 162.

The false color pixel 163, which is included in the first demosaicing image 160, is corrected by performing the correction processing by the moire correction processing unit 109, and in the image 175, which is represented by the image data 80, the two line images 176 and 177 corresponding to the two line-shaped objects 152 and 153, which are included in the first subject 151, are normally displayed without moire.

Next, an action of the imaging apparatus 10 according to the second embodiment will be described with reference to FIG. 9. FIG. 9 shows an example of a flow of the image generation processing according to the second embodiment. In the image generation processing shown in FIG. 9, steps S21 to S27 are the same as steps S11 to S17 of the image generation processing according to the first embodiment.

After step S27, the processing shown in FIG. 9 shifts to step S28. In step S28, the similar region determination unit

110 determines whether or not the similarity degree between the demosaicing image and the distance image is equal to or higher than a default similarity degree based on the demosaicing image data 83 and the high-reliability degree distance data 84. In step S28, in a case where the similarity degree between the demosaicing image and the distance image is equal to or higher than the default similarity degree, the determination is set as positive, and the processing shown in FIG. 9 shifts to step S29. On the other hand, in step S28, in a case where the similarity degree between the demosaicing image and the distance image is lower than the default similarity degree, the determination is set as negative, and the processing shown in FIG. 9 is ended without performing the correction processing, which will be described later.

In step S29, the similar region data acquisition unit 111 acquires the similar region data 86 from the demosaicing image data 83.

In step S30, the correction target pixel specification unit 112 specifies a pixel included in the similar region of the demosaicing image as the correction target pixel based on the similar region data 86.

In step S31, the moire correction processing unit 113 performs the correction processing of correcting the false signal, which is generated by the demosaicing processing, on the non-phase difference pixel data 73A of the pixel specified as the correction target pixel.

After the processing of step S31 is executed, the processing shown in FIG. 9 is ended. The imaging method described as the action of the imaging apparatus 10 described above is an example of an "imaging method" according to the present disclosed technology.

As described above, in the imaging apparatus 10 according to the second embodiment, in a case where the similarity degree between the demosaicing image obtained by the demosaicing processing and the distance image obtained based on the distance data 82 is equal to or higher than the default similarity degree, the CPU 62 specifies a pixel, among the plurality of pixels, included in the similar region of the demosaicing image as the correction target pixel. Therefore, it is possible to improve the accuracy of specifying the correction target pixel in which the correction processing is to be performed as compared with the case where the correction target pixel is specified based on the entire demosaicing image data 83.

Further, as long as the similarity degree is equal to or higher than the default similarity degree, the correction target pixel specification unit 112 may specify pixels, among the plurality of pixels, corresponding to adjacent pixels in the distance image as the correction target pixels.

In the example shown in FIG. 8, for example, the correction target pixel specification unit 112 may specify pixels, among the plurality of pixels, corresponding to adjacent pixels (that is, pixels forming the line images 171 and 172) in the first distance image 170 as the correction target pixels. Further, in this case, for example, the moire correction processing unit 113 may perform the correction processing by averaging pixel values of pixels, among the plurality of pixels, corresponding to the pixels forming the line images 171 and 172. In this case, it is possible to perform the correction processing of correcting the false signal generated by the demosaicing processing, on the non-phase difference pixel data 73A of pixels corresponding to the adjacent pixels in the first distance image 170.

Further, in the second embodiment, although the CPU 62 acquires the high-reliability degree distance data 84 from the distance data 82 and acquires the similar region data 86 based on the high-reliability degree distance data 84, the CPU 62 may acquire the similar region data 86 based on the distance data 82.

Further, in the second embodiment, although the CPU 62 acquires the first high-frequency component data 85 from the high-reliability degree distance data 84 and specifies the correction target pixel based on the first high-frequency component data 85 and the similar region data 86, the CPU 62 may specify the correction target pixel based on the similar region data 86.

Third Embodiment

As an example shown in FIG. 10, in a third embodiment, the functional configuration of the CPU 62 is changed as follows with respect to the first embodiment. That is, the CPU 62 operates as the RAW data acquisition unit 101, the distance data acquisition unit 103, the reliability degree determination unit 104, the high-reliability degree distance data acquisition unit 105, a direction determination processing unit 114, and a demosaicing processing unit 115.

The RAW data acquisition unit 101, the distance data acquisition unit 103, the reliability degree determination unit 104, and the high-reliability degree distance data acquisition unit 105 are the same as those in the first embodiment.

The direction determination processing unit 114 performs direction determination processing on the high-reliability degree distance data 84. As an example, the direction determination processing is Sobel filter processing.

Figure 10:
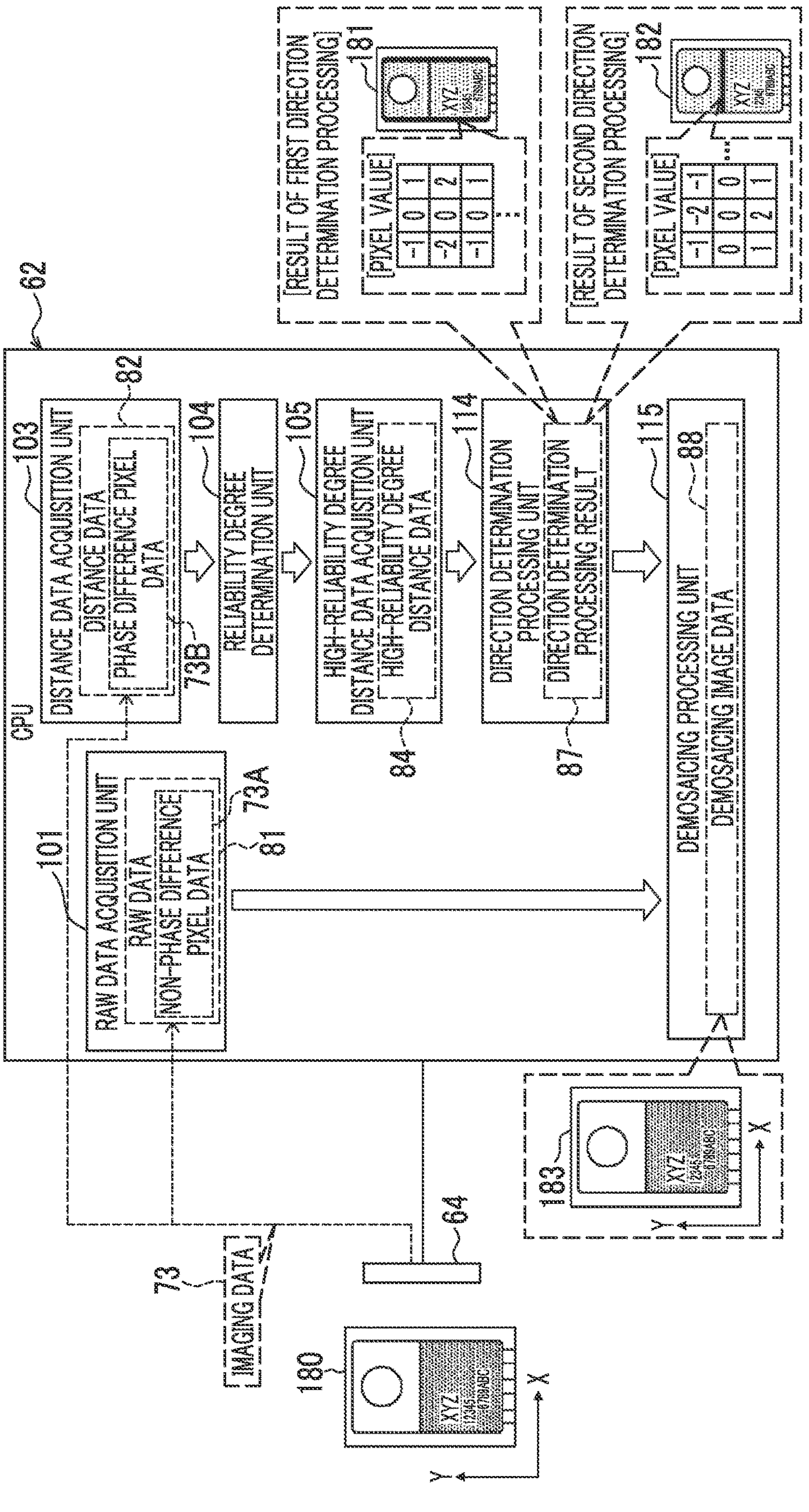
FIG. 10 is an explanatory diagram showing an example of the image generation processing executed by the CPU according to a third embodiment.

As an example, FIG. 10 shows an example of a direction determination processing result 87 obtained by the direction determination processing. The direction determination processing result 87 is a result obtained by performing the direction determination processing on the high-reliability degree distance data 84 obtained for a subject 180. A first processing image 181 is an image showing a result obtained by performing first direction determination processing of detecting an edge in the X direction as the direction determination processing, and a second processing image 182 is an image showing a result obtained by performing second direction determination processing of detecting an edge in the Y direction as the direction determination processing.

By performing the direction determination processing, pixel values are obtained for each of the plurality of pixels included in the RAW image 91 (see FIG. 6) represented based on the RAW data 81. The presence or absence of an edge, which is formed with pixels adjacent in the X direction or the Y direction (hereinafter, referred to as adjacent pixels), a position of the edge, and a direction in which the edge extends are determined based on an arrangement of the pixel values. For example, in the example shown in FIG. 10, a result in which the pixel values are arranged in the Y direction as "0, 0, 0 . . . " is obtained by the first direction determination processing. Accordingly, the presence of the edge, which extends in the Y direction, and the position of the edge in the X direction can be determined through the adjacent pixels. Further, in the example shown in FIG. 10, a result in which the pixel values are arranged in the X direction as "0, 0, 0 . . . " is obtained by the second direction determination processing. Accordingly, the presence of the edge, which extends in the X direction, and the position of the edge in the Y direction can be determined through the adjacent pixels.

The demosaicing processing unit 115 performs the demosaicing processing on the RAW data 81 based on the result of the direction determination processing. In this case, for example, based on the direction determination processing, the demosaicing processing unit 115 estimates a direction of the edge where an attention pixel is included and interpolates the non-phase difference pixel data 73A of the attention pixel by using processing such as weighted averaging prioritizing the non-phase difference pixel data 73A of neighborhood pixels included in the same edge as the attention pixel.

In the example shown in FIG. 10, in the demosaicing processing with respect to the RAW data 81, by interpolating the pixel data of the pixels included in the adjacent pixels, the subject image corresponding to the subject 180 is normally displayed in the demosaicing image 183 represented by the demosaicing image data 88 without moire.

In the third embodiment, the RAW image 91 (see FIG. 3) represented based on the RAW data 81 is an example of a "captured image" according to the present disclosed technology. Further, the high-reliability degree distance data 84 of which the reliability degree is equal to or higher than the default reliability degree is an example of "second distance data of which a reliability degree is equal to or higher than a second reliability degree" according to the present disclosed technology.

Figure 11:
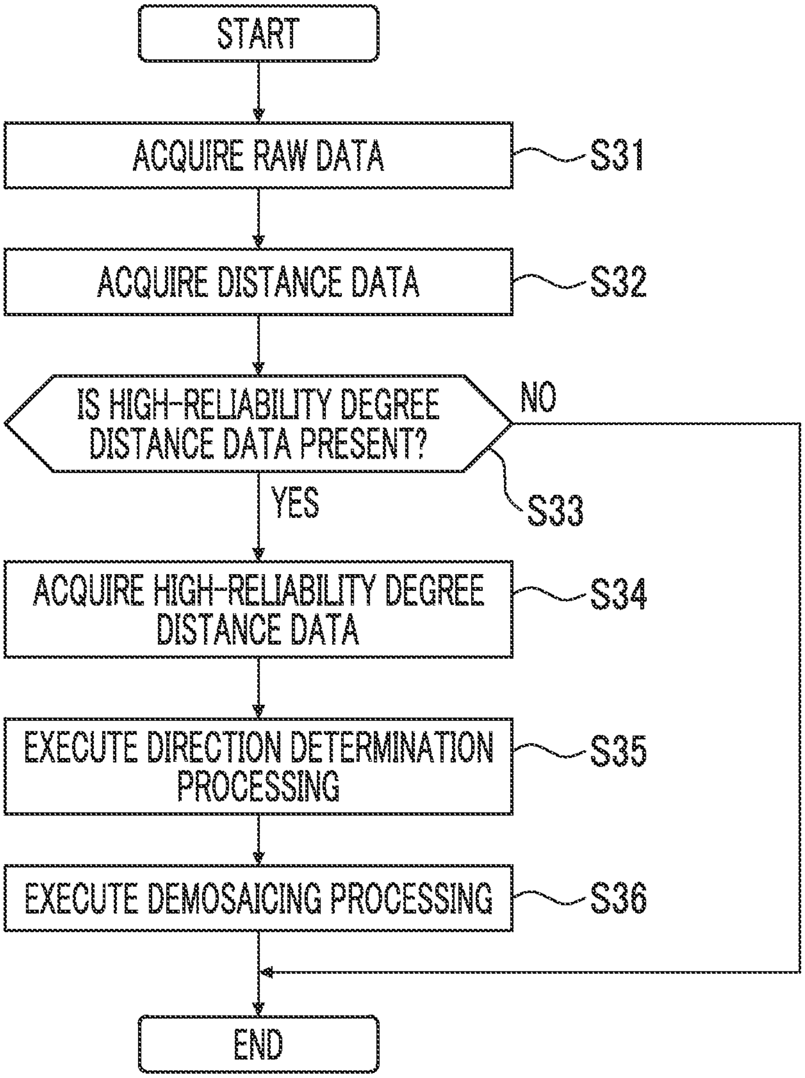
FIG. 11 is a flowchart showing an example of a flow of the image generation processing executed by the CPU according to the third embodiment.

Next, an action of the imaging apparatus 10 according to the third embodiment will be described with reference to FIG. 11. FIG. 11 shows an example of a flow of the image generation processing according to the third embodiment. In the image generation processing shown in FIG. 11, step S31 is the same as step S11 of the image generation processing according to the first embodiment. Further, in the image generation processing shown in FIG. 11, steps S32 to S34 are the same as steps S13 to 15 of the image generation processing according to the first embodiment.

After step S34, the processing shown in FIG. 11 shifts to step S35. In step S35, the direction determination processing unit 114 performs direction determination processing on the high-reliability degree distance data 84.

In step S36, the demosaicing processing unit 115 performs the demosaicing processing on the RAW data 81 based on the result of the direction determination processing.

After the processing of step S36 is executed, the processing shown in FIG. 11 is ended. The imaging method described as the action of the imaging apparatus 10 described above is an example of an "imaging method" according to the present disclosed technology.

As described above, in the imaging apparatus 10 according to the third embodiment, the CPU 62 acquires the distance data 82 related to the distance between the imaging apparatus 10 and the subject 180 for each of the plurality of pixels included in the RAW image 91 (see FIG. 6) obtained by being captured by the image sensor 20. Further, the CPU 62 performs the direction determination processing on the distance data 82 and performs the demosaicing processing on the RAW data 81 based on the result of the direction determination processing. Therefore, for example, the accuracy of a direction determination can be improved as compared with the case where the direction determination processing is performed on the RAW data 81.

Further, since the accuracy of the direction determination can be improved, it is possible to suppress moire generated in the demosaicing image 183 as compared with the case where, for example, only the demosaicing processing with respect to the RAW data 81 is performed.

Further, the CPU 62 acquires the high-reliability degree distance data 84 of which the reliability degree is equal to or higher than the default reliability degree from the distance data 82, and performs the direction determination processing on the high-reliability degree distance data 84. Therefore, it is possible to improve the accuracy of specifying the correction target pixel in which the correction processing is to be performed as compared with the case where the direction determination processing is performed on the entire distance data 82.

In the third embodiment, the CPU 62 acquires the high-reliability degree distance data 84 from the distance data 82 and performs the direction determination processing on the high-reliability degree distance data 84, but may also perform the direction determination processing on the distance data 82.

Although the first to third embodiments have been described above, the above-described embodiments and the modification examples can be combined with each other as long as no inconsistency occurs. Further, in a case where the above-described embodiments and the modification examples are combined and there are a plurality of overlapping steps, priorities may be given to the plurality of steps according to various conditions and the like.

Further, in the above embodiment, although the CPU 62 is exemplified, at least one other CPU, at least one GPU, and/or at least one TPU may be used instead of the CPU 62 or together with the CPU 62.

Further, in the above embodiment, although an example of the embodiment in which the program 65 is stored in the NVM 64 has been described, the present disclosed technology is not limited to this. For example, the program 65 may be stored in a portable non-temporary storage medium such as an SSD or a USB memory. The program 65 stored in the non-temporary storage medium is installed in the controller 12 of the imaging apparatus 10. The CPU 62 executes the image generation processing according to the program 65.

Further, the program 65 may be stored in the storage device such as another computer or a server device connected to the imaging apparatus 10 via the network, the program 65 may be downloaded in response to the request of the imaging apparatus 10, and the program 65 may be installed in the controller 12.

It is not necessary to store all of the programs 65 in the storage device such as another computer or a server device connected to the imaging apparatus 10, or the NVM 64, and a part of the program 65 may be stored.

Further, although the imaging apparatus 10 shown in FIGS. 1 and 2 has a built-in controller 12, the present disclosed technology is not limited to this, for example, the controller 12 may be provided outside the imaging apparatus 10.

Further, in the above embodiment, although the controller 12, which includes the CPU 62, NVM 64, and RAM 66, is exemplified, the present disclosed technology is not limited to this, and a device including an ASIC, FPGA, and/or PLD may be applied instead of the controller 12. Further, instead of the controller 12, a combination of a hardware configuration and a software configuration may be used.

Further, as a hardware resource for executing the image generation processing described in the embodiment, the following various processors can be used. Examples of the processor include software, that is, a CPU, which is a general-purpose processor that functions as a hardware resource for executing the image generation processing by executing a program.

Further, examples of the processor include a dedicated electric circuit, which is a processor having a circuit configuration specially designed for executing specification processing such as FPGA, PLD, or ASIC. A memory is built-in or connected to any processor, and each processor executes the image generation processing by using the memory.

The hardware resource for executing the image generation processing may be configured with one of these various types of processors or may be configured with a combination (for example, a combination of a plurality of FPGAs or a combination of a CPU and an FPGA) of two or more processors of the same type or different types. Further, the hardware resource for executing the image generation processing may be one processor.

As an example of configuring with one processor, first, one processor is configured with a combination of one or more CPUs and software, and there is an embodiment in which this processor functions as a hardware resource for executing the image generation processing. Secondly, as typified by SoC, there is an embodiment in which a processor that implements the functions of the entire system including a plurality of hardware resources for executing the image generation processing with one IC chip is used. As described above, the image generation processing is implemented by using one or more of the above-mentioned various types of processors as a hardware resource.

Further, as the hardware-like structure of these various processors, more specifically, an electric circuit in which circuit elements such as semiconductor elements are combined can be used. Further, the above-mentioned image generation processing is only an example. Therefore, it goes without saying that unnecessary steps may be deleted, new steps may be added, or the processing order may be changed within a range that does not deviate from the purpose.

The contents described above and the contents shown in the illustration are detailed explanations of the parts related to the present disclosed technology and are only an example of the present disclosed technology. For example, the description related to the configuration, function, action, and effect described above is an example related to the configuration, function, action, and effect of a portion according to the present disclosed technology. Therefore, it goes without saying that unnecessary parts may be deleted, new elements may be added, or replacements may be made to the contents described above and the contents shown in the illustration, within the range that does not deviate from the purpose of the present disclosed technology. Further, in order to avoid complications and facilitate understanding of the parts of the present disclosed technology, in the contents described above and the contents shown in the illustration, the descriptions related to the common technical knowledge or the like that do not require special explanation in order to enable the implementation of the present disclosed technology are omitted.

In the present specification, "A and/or B" is synonymous with "at least one of A or B". That is, "A and/or B" means that it may be only A, it may be only B, or it may be a combination of A and B. Further, in the present specification, in a case where three or more matters are connected and expressed by "and/or", the same concept as "A and/or B" is applied.

All documents, patent applications, and technical standards described in the present specification are incorporated in the present specification by reference to the same extent in a case where it is specifically and individually described that the individual documents, the patent applications, and the technical standards are incorporated by reference.

What is claimed is:

1. An imaging apparatus comprising:
an image sensor configured to capture image data; and
a processor,
wherein the processor is configured to:
perform demosaicing processing on the captured image data obtained from the image sensor;
acquire distance data representing a distance between the imaging apparatus and a subject for each of a plurality of pixels included in a captured image represented based on the captured image data;
acquire high-frequency component data, included in the distance data, of which a frequency is higher than a first default frequency;
specify a correction target pixel from among the plurality of pixels based on the high-frequency component data; and
perform correction processing of correcting a false signal generated by the demosaicing processing, on correction target pixel data of the correction target pixel.

2. The imaging apparatus according to claim 1,
wherein the processor is configured to specify a pixel, from among the plurality of pixels, corresponding to the pixel data having the first high-frequency component, based on the captured image data and the distance data.

3. The imaging apparatus according to claim 1,
wherein the correction processing is processing of decreasing chroma saturation or is filtering processing.

4. The imaging apparatus according to claim 1,
wherein the processor is configured to, in a case where a similarity degree between a demosaicing image obtained by the demosaicing processing and a distance image obtained based on the distance data is equal to or higher than a default similarity degree, specify a pixel, among the plurality of pixels, included in a similar region of the demosaicing image as the correction target pixel.

5. The imaging apparatus according to claim 4,
wherein the processor is configured to, in a case where the similarity degree is equal to or higher than the default similarity degree, specify pixels, among the plurality of pixels, corresponding to adjacent pixels in the distance image as the correction target pixels.

6. The imaging apparatus according to claim 4,
wherein the correction processing is processing of interpolating color of the correction target pixel with color of a pixel, which is other than the correction target pixel, included in the similar region.

7. The imaging apparatus according to claim 1,
wherein the processor is configured to:
acquire first distance data of which a reliability degree is equal to or higher than a first reliability degree, from the distance data; and
specify a pixel, among the plurality of pixels, corresponding to the first distance data as the correction target pixel.

8. The imaging apparatus according to claim 1,
wherein the image sensor includes a plurality of phase difference pixels, and
the processor is configured to acquire the distance data based on phase difference pixel data of the phase difference pixel, from the captured image data.

9. The imaging apparatus according to claim 8,
wherein the phase difference pixel is a pixel for selectively outputting non-phase difference pixel data and the phase difference pixel data,
the non-phase difference pixel data is pixel data obtained by performing photoelectric conversion in an entire region of the phase difference pixels, and the phase difference pixel data is pixel data obtained by performing the photoelectric conversion in a partial region of the phase difference pixels.

10. An imaging apparatus comprising:

an image sensor; and a processor, wherein the processor is configured to:

acquire distance data related to a distance between the imaging apparatus and a subject for each of a plurality of pixels included in a captured image obtained by being captured by the image sensor;

perform direction determination processing on the distance data to detect edges formed by consecutive pixels in a first direction or a second direction; and perform demosaicing processing on captured image data representing the captured image, by estimating an edge among the edges where an attention pixel is included and interpolating non-phase difference pixel data of the attention pixel by a weighted average of neighborhood pixels included in the same edge as the attention pixel.

11. The imaging apparatus according to claim 10, wherein the processor is configured to:

acquire second distance data of which a reliability degree is equal to or higher than a second reliability degree, from the distance data; and perform the direction determination processing on the second distance data.

12. An imaging method comprising:

performing demosaicing processing on captured image data obtained from and captured by an image sensor of an imaging apparatus;

acquiring distance data representing a distance between the imaging apparatus and a subject for each of a plurality of pixels included in a captured image represented based on the captured image data;

acquiring high-frequency component data, included in the distance data, of which a frequency is higher than a first default frequency;

specifying a correction target pixel from among the plurality of pixels based on the high-frequency component data; and performing correction processing of correcting a false signal generated by the demosaicing processing, on correction target pixel data of the correction target pixel.

13. An imaging method comprising:

acquiring distance data related to a distance between an imaging apparatus and a subject for each of a plurality of pixels included in a captured image obtained by being captured by an image sensor of the imaging apparatus;

performing direction determination processing on the distance data to detect edges formed by consecutive pixels in a first direction or a second direction; and performing demosaicing processing on captured image data representing the captured image, by estimating an edge among the edges where an attention pixel is included and interpolating non-phase difference pixel data of the attention pixel by a weighted average of neighborhood pixels included in the same edge as the attention pixel.

14. An imaging apparatus comprising:

an image sensor; and a processor, wherein the processor is configured to:

perform demosaicing processing on captured image data obtained by being imaged by the image sensor;

acquire distance data representing a distance between the imaging apparatus and a subject for each of a plurality of pixels included in a captured image represented based on the captured image data;

specify a correction target pixel from among the plurality of pixels based on the distance data, wherein in a case where a similarity degree between a demosaicing image obtained by the demosaicing processing and a distance image obtained based on the distance data is equal to or higher than a default similarity degree, a pixel, among the plurality of pixels, included in a similar region of the demosaicing image is specified as the correction target pixel; and perform correction processing of correcting a false signal generated by the demosaicing processing, on correction target pixel data of the correction target pixel.

15. An imaging apparatus comprising:

an image sensor including a plurality of phase difference pixels; and a processor, wherein the processor is configured to:

perform demosaicing processing on captured image data obtained by being imaged by the image sensor;

acquire distance data representing a distance between the imaging apparatus and a subject for each of a plurality of pixels included in a captured image represented based on phase difference pixel data of the phase difference pixel, from the captured image data, wherein the phase difference pixel is a pixel for selectively outputting non-phase difference pixel data and the phase difference pixel data, wherein the non-phase difference pixel data is pixel data obtained by performing photoelectric conversion in an entire region of the phase difference pixels, and wherein the phase difference pixel data is pixel data obtained by performing the photoelectric conversion in a partial region of the phase difference pixels;

specify a correction target pixel from among the plurality of pixels based on the distance data; and perform correction processing of correcting a false signal generated by the demosaicing processing, on correction target pixel data of the correction target pixel.

* * * * *